(12) United States Patent
Sakatsume et al.

(10) Patent No.: US 10,983,358 B2
(45) Date of Patent: Apr. 20, 2021

(54) HEAT MOUNTED DISPLAY HAVING AN INTER-LENS STRUCTURE DISPOSED BETWEEN THE RIGHT-EYE LENS AND LEFT-EYE LENS

(71) Applicant: PANASONIC INTELLECTUAL PROPERTY MANAGEMENT CO., LTD., Osaka (JP)

(72) Inventors: Toshihiro Sakatsume, Kanagawa (JP); Hiroyasu Makino, Osaka (JP); Yasutoshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/797,899

(22) Filed: Feb. 21, 2020

(65) Prior Publication Data

US 2020/0192105 A1 Jun. 18, 2020

Related U.S. Application Data

(63) Continuation of application No. PCT/JP2019/014286, filed on Mar. 29, 2019.

(30) Foreign Application Priority Data

Mar. 30, 2018 (JP) .............................. JP2018-069357

(51) Int. Cl.
*G02B 27/01* (2006.01)
*G06T 7/90* (2017.01)

(52) U.S. Cl.
CPC ............ *G02B 27/0176* (2013.01); *G06T 7/90* (2017.01); *G02B 2027/0112* (2013.01); *G02B 2027/0169* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2012/0206816 A1* | 8/2012 | Yoshida ............. | G02B 27/0172 359/630 |
| 2017/0123209 A1* | 5/2017 | Spitzer ............... | G02B 27/0172 |

FOREIGN PATENT DOCUMENTS

JP    2017-187695 A    10/2017

OTHER PUBLICATIONS

International Search Report, dated May 7, 2019, in International Application No. PCT/JP2019/014286.

(Continued)

*Primary Examiner* — David D Davis
(74) *Attorney, Agent, or Firm* — Greenblum & Bernstein, P.L.C.

(57) ABSTRACT

A head mounted display is worn on a head of a user. The head mounted display includes a display device configured to display image; a casing that houses the display device; a right-eye lens and a left-eye lens attached to the casing; and an inter-lens structure disposed between the right-eye lens and the left-eye lens. The head mounted display causes the user to recognize a color of at least a part of the inter-lens structure as a color that is equal to or brighter than a skin color when the user wears the head mounted display.

14 Claims, 16 Drawing Sheets

(56) References Cited

OTHER PUBLICATIONS

International Preliminary Report on Patentability (English Language Translation), dated Oct. 6, 2020, in International Application No. PCT/JP2019/014286.
Japanese Office Action, dated Jan. 12, 2021 by the Japan Patent Office (JPO), in Japanese Patent Application No. 2020-509343, including English Language Machine Translation.

* cited by examiner

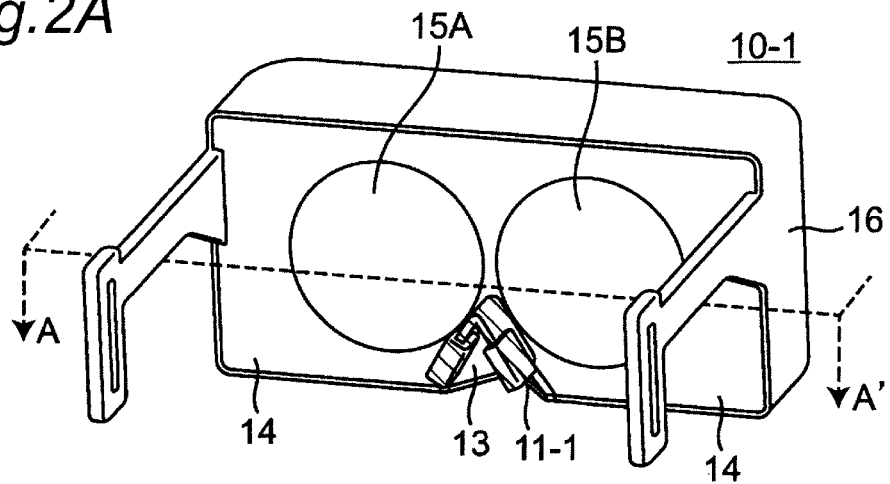
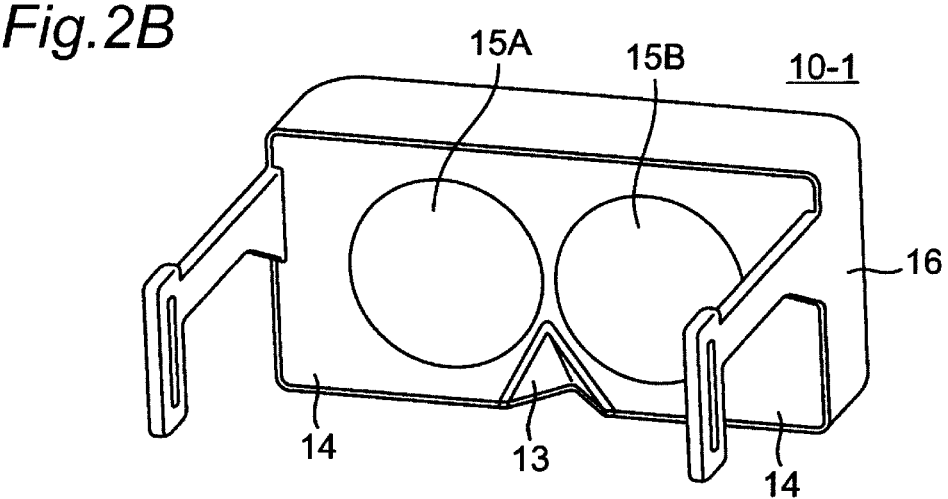
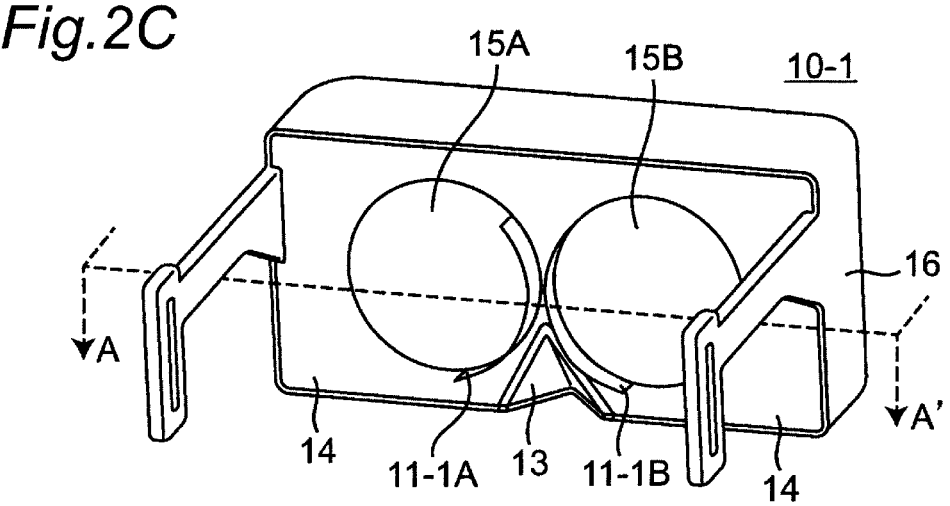

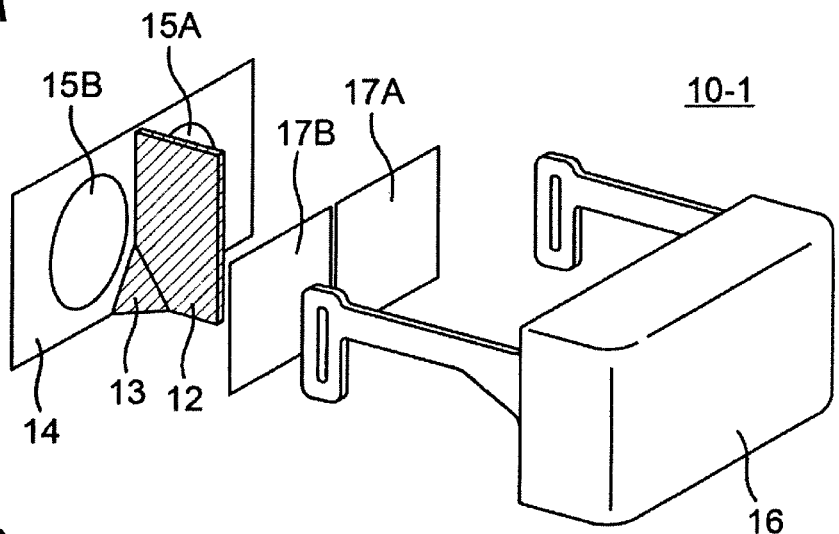
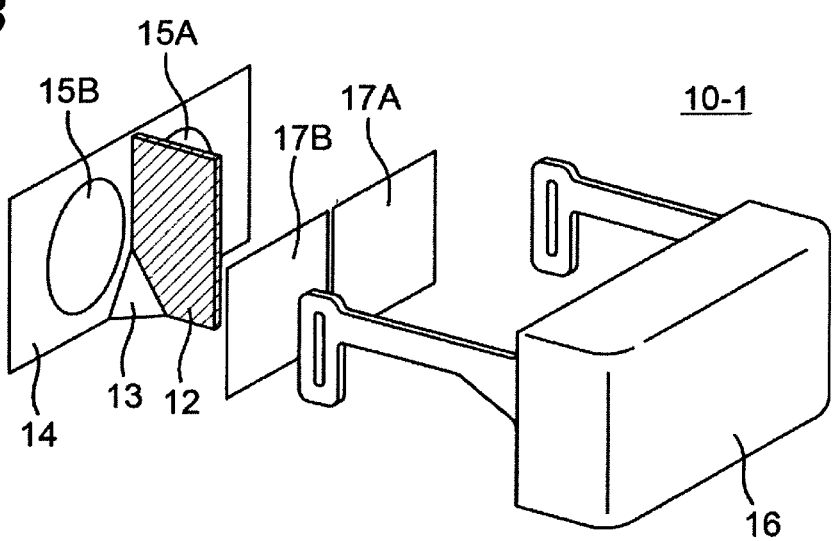
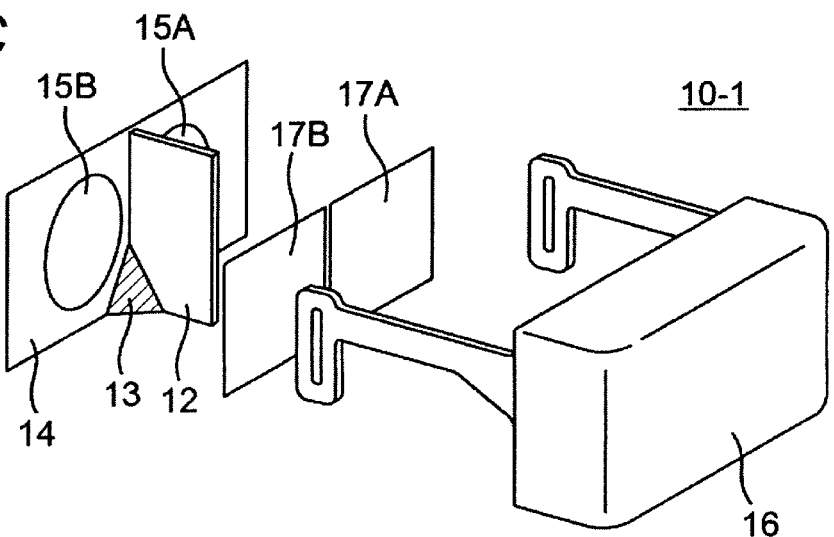

HEAT MOUNTED DISPLAY HAVING AN INTER-LENS STRUCTURE DISPOSED BETWEEN THE RIGHT-EYE LENS AND LEFT-EYE LENS

CROSS-REFERENCE TO RELATED APPLICATIONS

This is a continuation application of International Application No. PCT/JP2019/014286, with an international filing date of Mar. 29, 2019, which claims priority of Japanese Patent Application No.: 2018-069357 filed on Mar. 30, 2018, the content of which is incorporated herein by reference.

BACKGROUND ART

The present disclosure relates to a head mounted display that is worn on the head of the user and displays image.

JP 2017-187695 A discloses a head mounted display provided with: a display device; a frame to be used for fixing and disposing the display device in front of eyes of the user; a lens disposed at a distance from the display device; and a light-transmissive fixing member configured to fix the lens to the frame. The head mounted display of JP 2017-187695 A can provide a user with a field of view that is not blocked by the fixing member.

SUMMARY

The present disclosure provides a head mounted display that can reduce discomfort given to the user when a member enters the field of view, thereby allowing the user to have an immersion feeling.

A head mounted display to be worn on the head of the user according to the present disclosure is provided with a display device, a left-eye lens, a right-eye lens, a casing, and an inter-lens structure. The display device displays image. The casing houses the display device. The left-eye lens and the right-eye lens are attached to the casing. The inter-lens structure is disposed between the left-eye lens and the right-eye lens. When the user wears the head mounted display, the head mounted display causes the user to recognize a color of at least a part of the inter-lens structure as a color that is equal to or brighter than a skin color.

A head mounted display to be worn on the head of the user according to the present disclosure is provided with a first display device, a second display device, a casing, a left-eye lens, a right-eye lens, and an inter-lens structure. The first display device displays image to be presented to the left eye of the user. The second display device displays image to be presented to the right eye of the user. The casing houses the first and second display devices. The left-eye lens and the right-eye lens are attached to the casing. The inter-lens structure is disposed between the left-eye lens and the right-eye lens. The inter-lens structure includes a light emitting unit configured to emit light in an intended color.

It is possible with the present disclosure to provide a head mounted display that allows the user to be immersed in image displayed on the display device without discomfort.

BRIEF DESCRIPTION OF THE DRAWINGS

FIGS. 2A, 2B, and 2C are perspective views illustrating the appearance of head mounted displays (HMDs) according to embodiment 1.

FIGS. 4A, 4B, and 4C are diagrams illustrating variations of the configuration of an HMD according to embodiment 1.

DETAILED DESCRIPTION

Figure 1A:
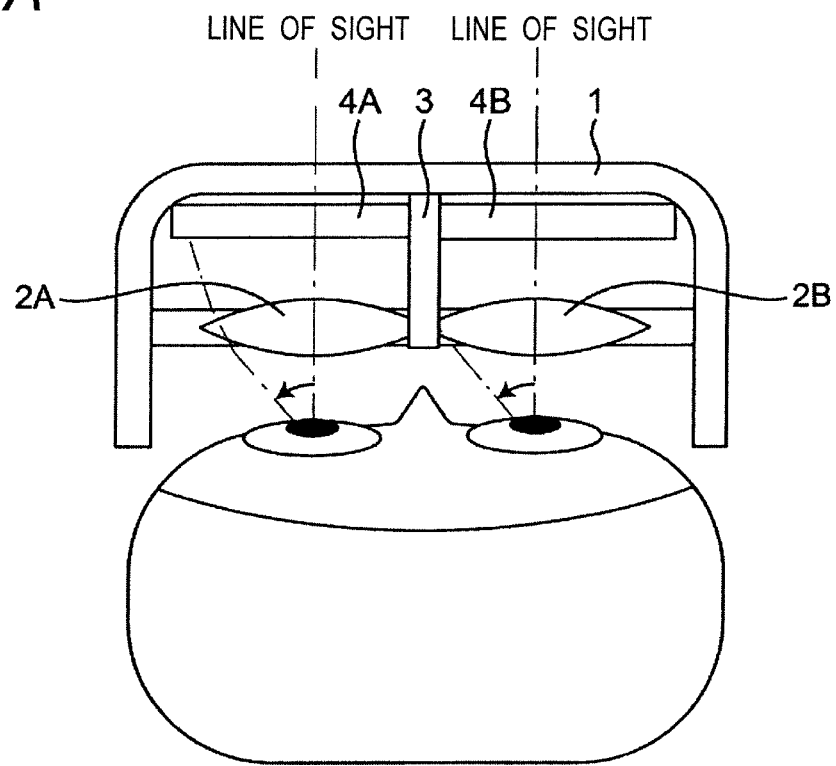
FIGS. 1A and 1B are diagrams for explaining problems in the prior art.

The first aspect of the present disclosure provides a head mounted display to be worn on the head of the user, the head mounted display including: a display device configured to display image; a casing that houses the display device; a right-eye lens and a left-eye lens attached to the casing; and an inter-lens structure disposed between the right-eye lens and the left-eye lens, in which the head mounted display causes the user to recognize the color of at least a part of the inter-lens structure as the color that is equal to or brighter than the skin color when the user wears the head mounted display.

The second aspect of the present disclosure provides the head mounted display according to the first aspect, in which the color that is equal to or brighter than the skin color is a color having a value of R within 65 to 255, a value of G within 39 to 255, and a value of B within 26 to 255 in an RGB color model in which R, G, and B are respectively represented with values of 0 to 255.

The third aspect of the present disclosure provides the head mounted display according to the second aspect, in which painting in the color that is equal to or brighter than the skin color is applied to the inter-lens structure, and the painting is irradiated with light emitted from the display device so that the user recognizes the color that is equal to or brighter than the skin color.

The fourth aspect of the present disclosure provides the head mounted display according to the second aspect, in which the inter-lens structure has a reflector configured to reflect light, and the reflector reflects light emitted from the display device so that the user recognizes the color that is equal to or brighter than the skin color.

The fifth aspect of the present disclosure provides the head mounted display according to the second aspect, in which the inter-lens structure has a light guide plate configured to guide light, and the light guide plate guides light emitted from the display device so that the user recognizes the color that is equal to or brighter than the skin color.

The sixth aspect of the present disclosure provides the head mounted display according to the second aspect, in which the inter-lens structure has a light emitting unit configured to emit light, and the light emitting unit emits light so that the user recognizes the color that is equal to or brighter than the skin color.

The seventh aspect of the present disclosure provides the head mounted display according to any one of the third to sixth aspects, in which the inter-lens structure has a shape protruding toward the nose of the user when the user wears the head mounted display.

The eighth aspect of the present disclosure provides the head mounted display according to any one of the third to sixth aspects, in which the display device has a first area where image to be presented to the left eye of the user is displayed, and a second area where image to be presented to the right eye of the user is displayed, and the inter-lens structure is a partition that is provided in the casing so that image in the first area is not visually recognized by the right eye of the user and image in the second area is not visually recognized by the left eye of the user.

The ninth aspect of the present disclosure provides the head mounted display according to any one of the third to sixth aspects, in which the inter-lens structure is a member (nose guard member) attached to the casing to protrude inward from the casing so that the nose of the user does not interfere with the casing when the user wears the head mounted display.

The tenth aspect of the present disclosure provides a head mounted display to be worn on the head of the user, the head mounted display including: a first display device configured to display image to be presented to the left eye of the user, a second display device configured to display image to be presented to the right eye of the user; a casing that houses the first and second display devices; a right-eye lens and a left-eye lens attached to the casing; and an inter-lens structure disposed between the left-eye lens and the right-eye lens, in which the inter-lens structure includes a light emitting unit configured to emit light in an intended color.

The eleventh aspect of the present disclosure provides the head mounted display according to the tenth aspect, in which the light emitting unit changes the color of emitted light based on image in a predetermined area of each display area of the first and second display devices.

The twelfth aspect of the present disclosure provides the head mounted display according to the eleventh aspect, in which the predetermined area is a left end area of the display area of the first display device and a right end area of the display area of the second display device.

The thirteenth aspect of the present disclosure provides the head mounted display according to the eleventh aspect, further including a camera configured to capture an image of the skin of the user, in which the light emitting unit changes the color of emitted light based on the skin color of the user included in the captured image.

The fourteenth aspect of the present disclosure provides the head mounted display according to the thirteenth aspect, in which the light emitting unit changes the color of emitted light based on the skin color of the user included in the captured image and the brightness of image displayed in the display area.

The fifteenth aspect of the present disclosure provides the head mounted display according to any one of the tenth to fourteenth aspects, in which the inter-lens structure has a shape protruding toward the nose of the user when the user wears the head mounted display.

The sixteenth aspect of the present disclosure provides the head mounted display according to any one of the tenth to fourteenth aspects, in which the display device has a first area where image to be presented to the left eye of the user is displayed, and a second area where image to be presented to the right eye of the user is displayed, and the inter-lens structure is a partition provided in the casing so that image in the first area is not visually recognized by the right eye of the user and image in the second area is not visually recognized by the left eye of the user.

The seventeenth aspect of the present disclosure provides the head mounted display according to any one of the tenth to fourteenth aspects, in which the inter-lens structure is a member (nose guard member) attached to the casing to protrude inward from the casing so that the nose of the user does not interfere with the casing when the user wears the head mounted display.

The eighteenth aspect of the present disclosure provides the head mounted display according to the seventh aspect, in which the inter-lens structure has a shape protruding toward the nose of the user along boundary parts between a fixing member configured to fix the right-eye lens and the left-eye lens, and the right-eye lens and the left-eye lens.

The nineteenth aspect of the present disclosure provides the head mounted display according to the seventh aspect, in which the inter-lens structure has a shape coming into contact with a left slope and a right slope of the nose of the user.

The twentieth aspect of the present disclosure provides the head mounted display according to the seventh aspect, in which the inter-lens structure comes into contact with the nose of the user and fixes the head mounted display to a face of the user.

Hereinafter, embodiments will be described in detail with reference to appropriate figures. However, more detailed description than necessary may be omitted. For example, detailed description of already well-known matters or redundant description of substantially the same configurations may be omitted. This is to avoid unnecessary redundancy in the following description and to facilitate understanding by those skilled in the art.

It is to be noted that the inventor(s) provides the accompanying drawings and the following description to allow those skilled in the art to fully understand the present disclosure, and the accompanying drawings and the following description are not intended to limit the subject matter described in the claims.

(Circumstances Leading to Present Disclosure)

Figure 1B:
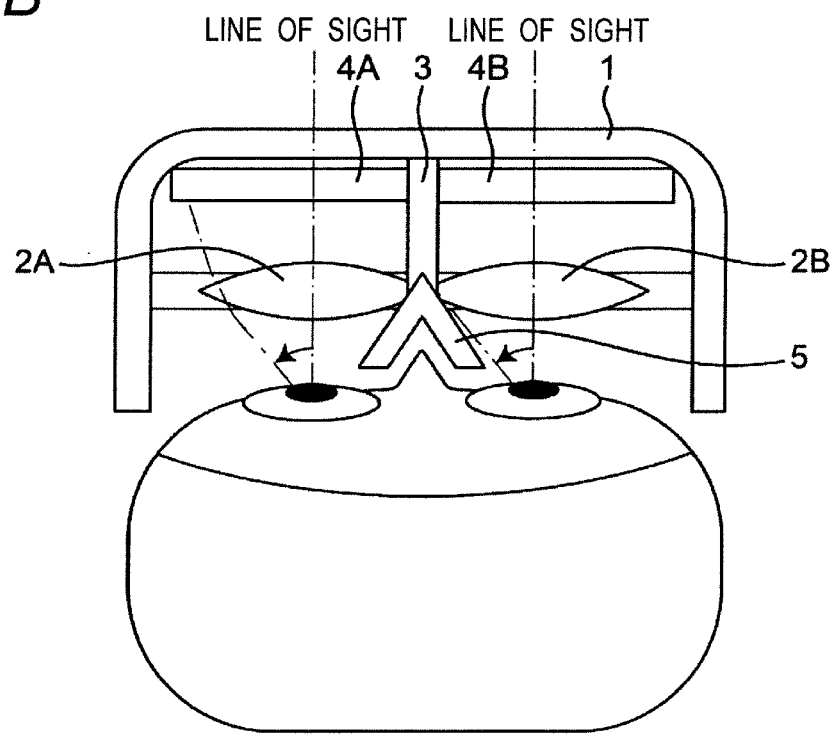

FIGS. 1A and 1B are diagrams for explaining a problem in the prior art. As illustrated in FIG. 1A, a head mounted display is provided with a liquid crystal display 4, lenses 2A and 2B, and a partition member 3 in a frame 1. In order to enable stereoscopic viewing, the liquid crystal display 4 can present image to be presented to the left eye of the user in an area 4A and present image to be presented to the right eye of the user in an area 4B.

The partition member 3 is provided to prevent the left and right image displayed for stereoscopic viewing each from entering the field of view of the other eye of the user.

However, when the user tilts his gaze, for example, the partition member 3 may enter the field of view and cause discomfort.

Such a problem can also occur in an HMD provided with a nose pad 5 as illustrated in FIG. 1B.

The configuration of a head mounted display that solves the above problem will be described below.

Embodiment 1

1-1. Configuration 1-1-1. Outline of Display System

FIG. 2A is a perspective view illustrating the appearance of a head mounted display (which will be hereinafter referred to as "HMD") according to embodiment 1. As illustrated in FIG. 2A, an HMD 10-1 according to the present embodiment is provided with a frame 16, lenses 15A and 15B, a nose pad 11-1, and a lens fixing member 14. FIG. 2B is a perspective view illustrating the appearance of the HMD 10-1 with the nose pad 11-1 removed for convenience of explanation. As illustrated in FIG. 2B, the HMD 10-1 is further provided with a nose guard member 13 below the nose pad 11-1.

The frame 16 is a member that covers the front portion of the HMD 10-1. Moreover, the frame 16 is provided with a mechanism for connecting a mounting band that fixes the HMD 10-1 to the head of the user.

The lenses 15A and 15B are used to widen the field of view of the user wearing the HMD 10-1. The lens 15A is a left-eye lens, and the lens 15B is a right-eye lens. The lenses 15A and 15B are made of glass, or a resin such as organic glass. Each of the lenses 15A and 15B is constituted of a single convex lens or concave lens, or constituted by combining a plurality of convex lenses or concave lenses.

It is to be noted that each of the lenses 15A and 15B may be disposed obliquely to surround a pupil of the user so as to widen the peripheral visual field of the user, or may be divided into a lens array.

The nose pad 11-1 and the nose guard member 13 have a function of bringing the HMD 10-1 into contact with the nose of the user and fixing the HMD 10-1 to the face of the user.

The nose pad 11-1 is attached to the lens fixing member 14 between the left-eye lens 15A and the right-eye lens 15B so as to protrude outward from the lens fixing member 14.

The nose guard member 13 is attached to the outer surface of the lens fixing member 14, and forms a recess (concave portion) at the outer surface of the HMD 10-1. When the user wears the HMD 10-1, the nose of the user is placed in this recess. This makes it possible to prevent the nose of the user from interfering with the HMD 10-1, and allows the user to wear the HMD 10-1 without being obstructed by the nose.

The lens fixing member 14 is a member that fixes the lenses 15A and 15B. The nose pad 11-1 and the nose guard member 13 are attached to the lens fixing member 14. The lens fixing member 14 and the frame 16 constitute a casing that houses various members related to image display.

Figure 3A:
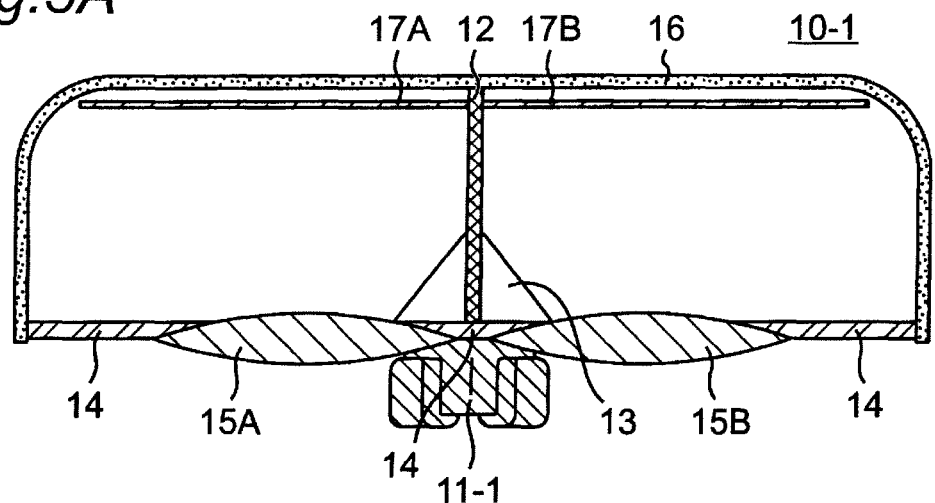
FIGS. 3A, 3B, and 3C are sectional views illustrating the configuration of HMDs according to embodiment 1.

FIG. 3A is a sectional view of the HMD 10-1 corresponding to the cross section A-A' in FIG. 2A. The HMD 10-1 is provided with liquid crystal displays 17A and 17B, and a partition member 12 therein.

The liquid crystal displays 17A and 17B are display devices configured to display image. The liquid crystal display 17A displays image for the left eye, and the liquid crystal display 17B displays image for the right eye. In order to enable stereoscopic viewing, the HMD 10-1 can display image having a parallax from each other on the liquid crystal display 17A for the left eye and the liquid crystal display 17B for the right eye, for example. The liquid crystal displays 17A and 17B are disposed on the inner surface of the front portion of the frame 16. The liquid crystal displays 17A and 17B may be constituted of a single liquid crystal display. In such a case, the display area of one liquid crystal display may be divided into a first display area for presenting image for the left eye and a second display area for presenting image for the right eye. It is to be noted that other display devices such as an organic EL display may be used instead of the liquid crystal displays 17A and 17B.

The left-eye lens 15A is disposed to face the liquid crystal display 17A for the left eye. The right-eye lens 15B is disposed to face the liquid crystal display 17B for the right eye. The lenses 15A and 15B are fixed to the lens fixing member 14.

The partition member 12 is a shielding member for preventing image displayed on the liquid crystal display 17A for the left eye from entering the field of view of the right eye of the user, and preventing image displayed on the liquid crystal display 17B for the right eye from entering the field of view of the left eye of the user.

The partition member 12 is disposed at the center of the internal space formed by the frame 16 and the lens fixing member 14 so as to divide the internal space into a space including the liquid crystal display 17A for the left eye and the left-eye lens 15A, and a space including the liquid crystal display 178 for the right eye and the right-eye lens 15B.

In the HMD 10-1 having the above configuration, at least the surface of the nose pad 11-1 especially has the skin color. That is, the surface of the nose pad 11-1 is colored into the skin color. Alternatively, the nose pad 11-1 is made of a skin color material. By making the nose pad 11-1 in the skin color, the nose pad 11-1 has substantially the same color as the nose of the user, and therefore the user can be immersed in the image displayed by the HMD 10-1 without discomfort even if the nose pad 11-1 blocks a part of the field of view of the user.

Here, the skin color is a color of human cutis (skin), and includes various colors. For example, in an RGB color model in which R, G, and B are respectively represented with values of 0 to 255, the skin color is a color having a value of R within 65 to 247, a value of G within 39 to 221, and a value of B within 26 to 208.

It is to be noted that the coloring of the nose pad 11-1 is not necessarily a strict skin color, and may be any color that is equal to or brighter than the skin color. For example, in an RGB color model in which R, G, and B are respectively represented with values of 0 to 255, the color that is equal to or brighter than the skin color is a color having a value of R within 65 to 255, a value of G within 39 to 255, and a value of B within 26 to 255.

It is to be noted that the skin color may be represented using a color space other than the RGB color space. For example, the skin color may be represented using a color space such as an HSV color space.

Moreover, even if the coloring of the nose pad 11-1 is not a strict skin color, it is only required to cause the user to recognize the color as the color that is equal to or brighter than the skin color. Therefore, for example, a fluorescent paint that shines strongly when irradiated with light from the liquid crystal displays 17A and 17B may be applied to the nose pad 11-1. Alternatively, a reflector such as a mirror may be attached to the nose pad 11-1 so as to reflect light from the liquid crystal displays 17A and 17B toward the pupils of the user. It is to be noted that the reflector may not be a mirror surface, and may be colored.

Alternatively, a light guide plate may be attached to the nose pad 11-1 so as to couple the light guide plate to the internal space of the HMD 10-1 formed by the frame 16 and the lens fixing member 14 and guide light emitted from the liquid crystal displays 17A and 17B to the nose pad 11-1. It is to be noted that the light guide plate may be transparent or colored.

1-3. Summary

As described above, the HMD 10-1 according to the present embodiment is provided with the nose pad 11-1 having the skin color at least on the surface. This allows the user to be immersed in image displayed on the liquid crystal displays 17A and 17B without discomfort even when the nose pad 11-1 blocks a part of the field of view of the user, since the nose pad has substantially the same color as the nose of the user.

Especially, a head mounted display with a wider viewing angle in the horizontal direction has the effect of reducing discomfort because the nose pad 11-1 appears to block the vicinity of the center of the field of view of the user when the user views image with both eyes.

Although embodiment 1 illustrates a configuration in which the nose pad 11-1 has the skin color, a member having the skin color is not limited to this.

For example, the nose pad 11-1 is not necessarily required if a helmet type or a headband type is used as a method of mounting the HMD 10-1. A protrusion other than the nose pad 11-1 may be formed between the left-eye lens 15A and the right-eye lens 15B. The protrusion protrudes toward the nose of the user when the user wears the HMD 10-1, that is, away from the left-eye lens 15A and the right-eye lens 15B. For example, a part of the lens fixing member 14 between the left-eye lens 15A and the right-eye lens 15B may be protruded, and the surface to be radiated with light emitted from the left-eye lens 15A and the right-eye lens 15B may have the skin color.

Figure 3B:
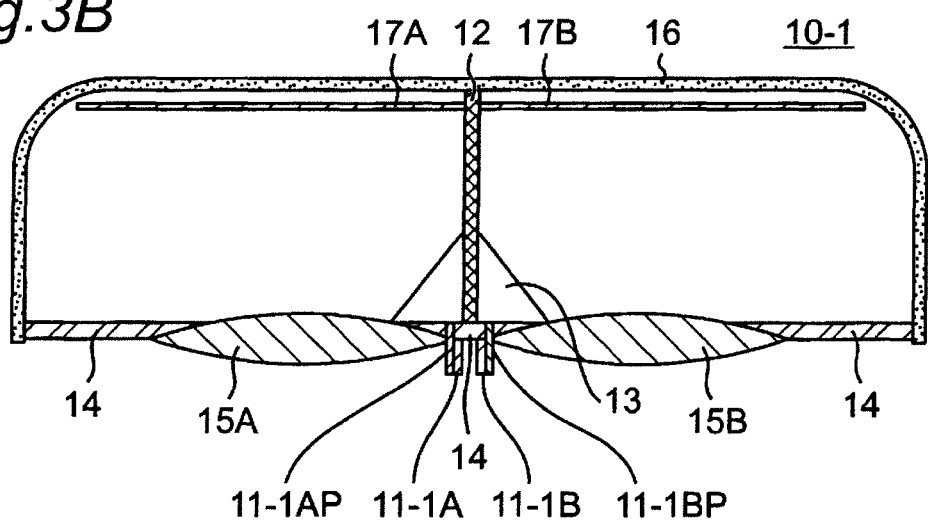

FIG. 2C is an example in which the frame protrusion 11-1A is formed along the boundary part between the left-eye lens 15A and the lens fixing member 14, and the frame protrusion 11-1B is formed along the boundary part between the right-eye lens 15B and the lens fixing member 14. FIG. 3B is a sectional view of the HMD 10-1 corresponding to the cross section A-A' in FIG. 2C. The surface 11-1AP of the frame protrusion 11-1A to be irradiated with light emitted from the left-eye lens 15A is colored into the skin color, and the surface 11-1BP of the frame protrusion 11-1B to be irradiated with light emitted from the right-eye lens 15B is colored into the skin color.

Moreover, even if the surface of the frame protrusions 11-1A and 11-1B does not have a strict skin color, it is only required to cause the user to recognize the surface as the color that is equal to or brighter than the skin color. Therefore, a reflector may be applied on or attached to the respective surfaces 11-1AP and 11-1BP of the frame protrusions 11-1A and 11-1B in FIG. 3B. As a result, light emitted from the left-eye lens 15A may be reflected by the surface 11-1AP toward a pupil of the user, and light emitted from the right-eye lens 15B may be reflected by the surface 11-1BP toward a pupil of the user.

Figure 3C:
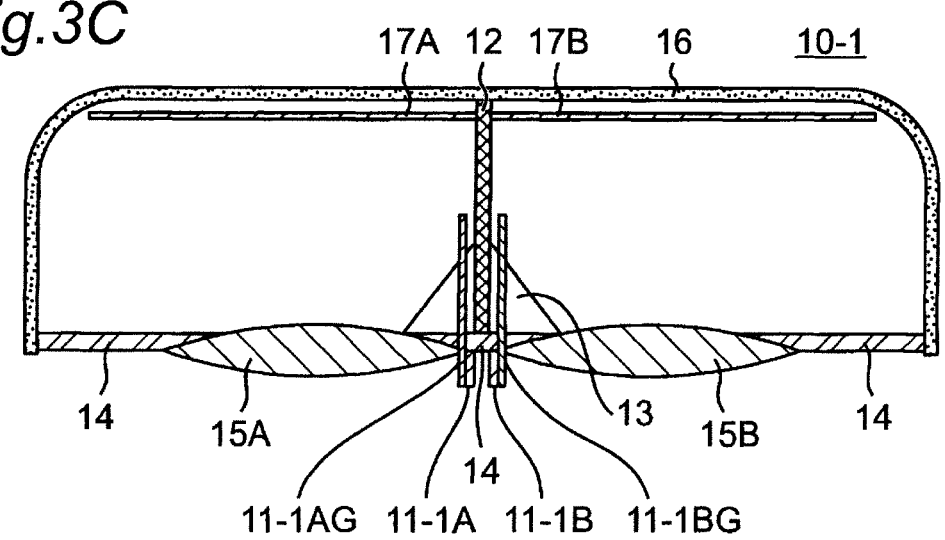

Alternatively, a light guide plate may be attached to the frame protrusions 11-1A and 11-1B. FIG. 3C is a sectional view of the HMD 10-1 corresponding to the cross section A-A' in FIG. 2C. The light guide plate 11-1AG may be attached to the frame protrusion 11-1A, and the light guide plate 11-1BG may be attached to the frame protrusion 11-1B. The light guide plates 11-1AG and 11-1BG may be coupled to the internal space of the HMD 10-1 formed by the frame 16 and the lens fixing member 14 so as to guide light emitted from the liquid crystal displays 17A and 17B to the frame protrusions 11-1A and 11-1B.

Although the left-eye and right-eye frame protrusions 11-1A and 11-1B are separated and formed into two hills in the example of FIG. 2C, it is to be noted that the left-eye and right-eye frame protrusions 11-1A and 11-1B may be formed in one hill, or may be combined with a nose pad.

Moreover, for example, the partition member 12 and the nose guard member 13 (inner side) may have the skin color in addition to the nose pad 11-1 as illustrated in FIG. 4A. Moreover, only the partition member 12 may have the skin color in addition to the nose pad 11-1 as illustrated in FIG. 4B. Alternatively, the inner side of the nose guard member 13 may have the skin color in addition to the nose pad 11-1 as illustrated in FIG. 4C. Alternatively, at least one of the nose pad 11-1, the partition member 12, and the nose guard member 13 may have the skin color.

It is to be noted that the nose pad 11-1, the partition member 12, and the nose guard member 13 are examples of the inter-lens structure. The inter-lens structure is a portion (member) extending in the front-rear direction between the left-eye lens 15A and the right-eye lens 15B.

Moreover, the above-described values of RGB and HSV are merely examples, and the color that is equal to or brighter than the skin color is not limited to the above-described values as long as the user recognizes the color of at least a part of the inter-lens structure as the color that is equal to or brighter than the skin color.

Embodiment 2

In embodiment 1, the nose pad 11-1 of the HMD is made of a material having the skin color. On the other hand, the present embodiment describes a configuration of an HMD provided with a nose pad that emits the skin color or a representative color described later.

2-1. Configuration 2-1-1. Configuration of Head Mounted Display

Figure 5:
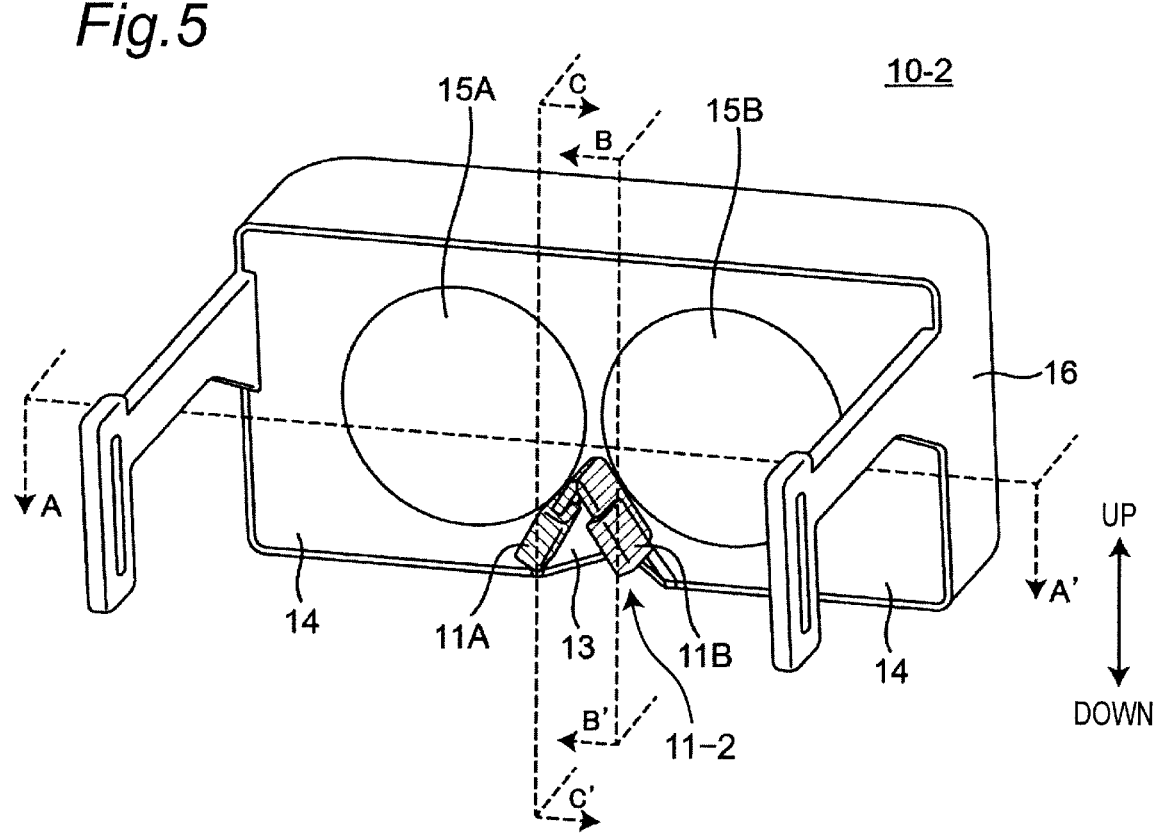
FIG. 5 is a perspective view illustrating the appearance of an HMD according to embodiment 2.

FIG. 5 is a perspective view illustrating the appearance of an HMD according to the present embodiment. In FIG. 5, an HMD 10-2 according to the present embodiment is different from embodiment 1 in that a nose pad 11-2 that emits the skin color or a representative color is provided.

The nose pad 11-2 of the present embodiment is provided with light guide plates 11A and 11B. The light guide plate 11A comes into contact with the left slope of the nose of the user wearing the HMD 10-2. The light guide plate 11B comes into contact with the right slope of the nose of the user wearing the HMD 10-2.

Figure 6A:
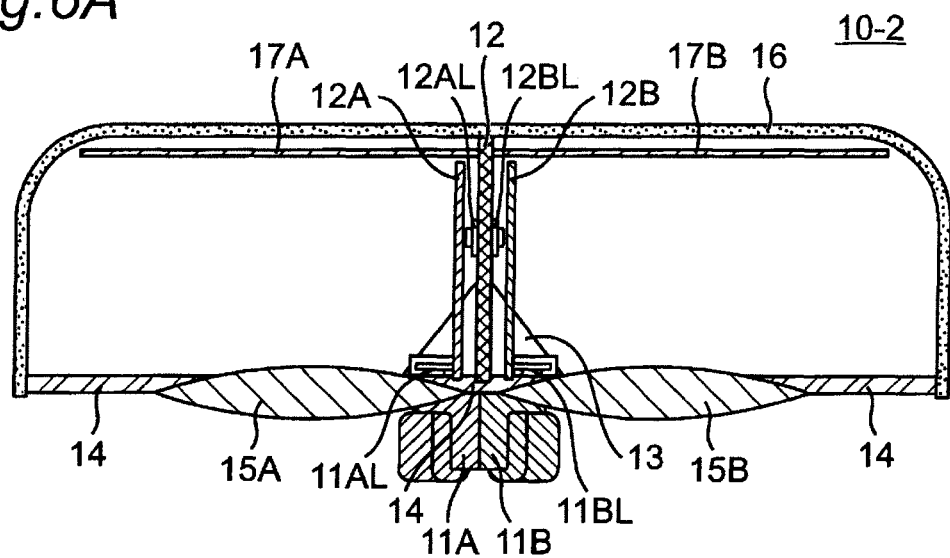
FIGS. 6A and 6B are sectional views illustrating the configuration of HMDs according to embodiment 2.

FIG. 6A is a sectional view illustrating the configuration of the HMD according to the present embodiment. The HMD 10-2 according to the present embodiment is provided with an LED light source 11AL that irradiates the external light guide plate 11A with light, and an LED light source 11BL that irradiates the external light guide plate 11B with light therein. The HMD 10-2 is also provided with light guide plates 12A and 12B on both sides of a partition member 12. The HMD 10-2 is further provided with LED light sources 12AL and 12BL configured to irradiate the internal light guide plates 12A and 12B with light. The LED light sources 11AL, 11BL, 12AL, and 12BL are provided with LED elements respectively configured to emit light in colors of R, G, and B, and are light emitting units that can output light in any color.

Figure 7:
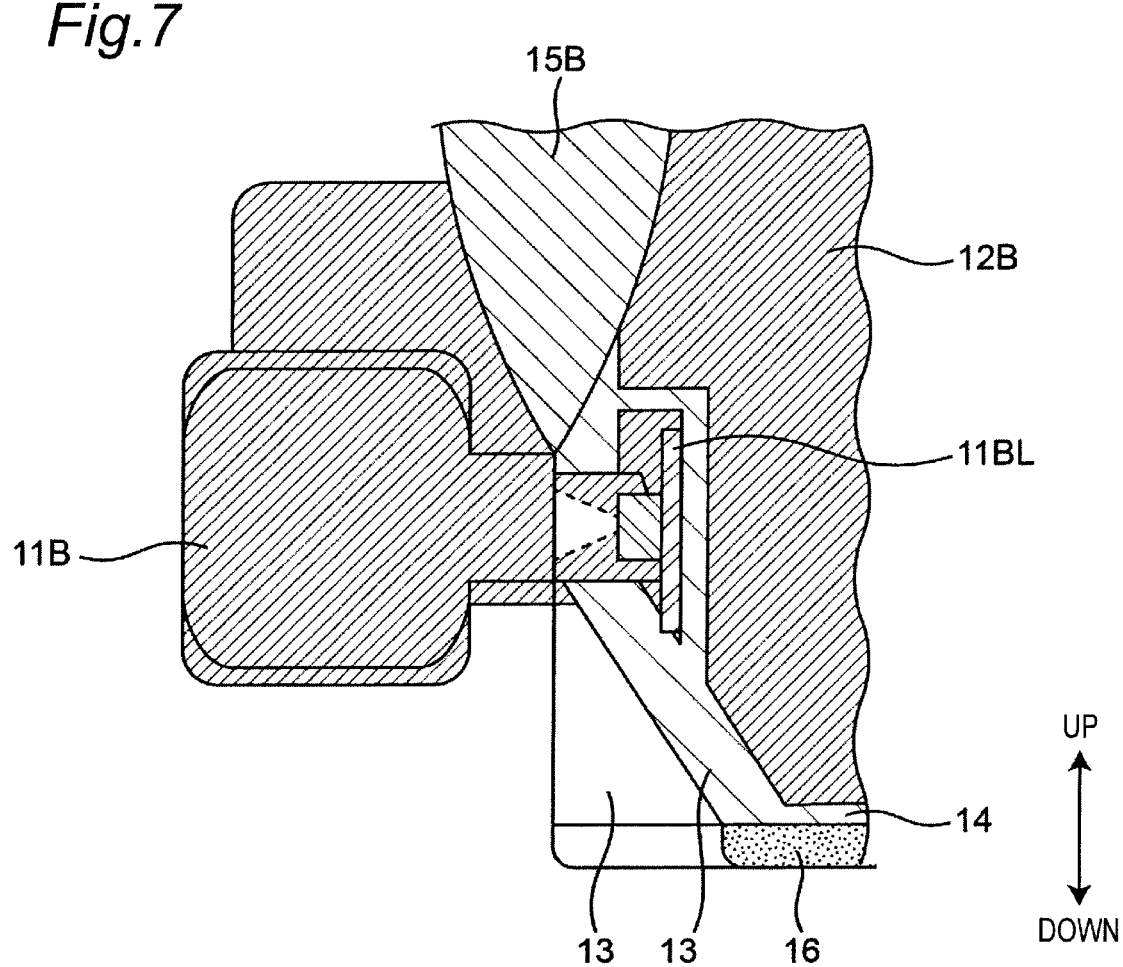
FIG. 7 is a sectional view illustrating the configuration of the vicinity of a nose pad according to embodiment 2.

FIG. 7 is a sectional view illustrating the configuration of the vicinity of the nose pad 11-2 corresponding to the cross section B-B' in FIG. 5. As illustrated in FIG. 7, the LED light source 11BL is disposed to irradiate the light guide plate 11B of the nose pad 11-2 with light. Although not illustrated, the LED light source 11AL is disposed to irradiate the light guide plate 11A of the nose pad 11-2 with light.

Figure 8:
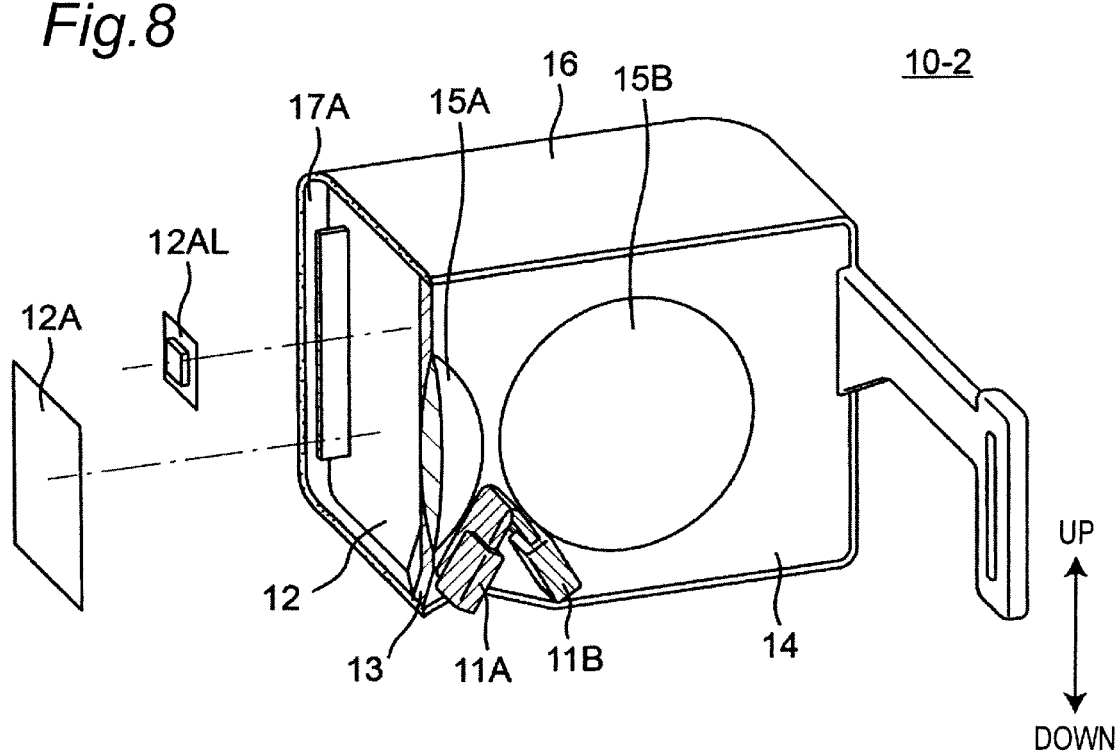
FIG. 8 is a sectional development elevation illustrating the configuration of the vicinity of a partition member according to embodiment 2.
Figure 9:
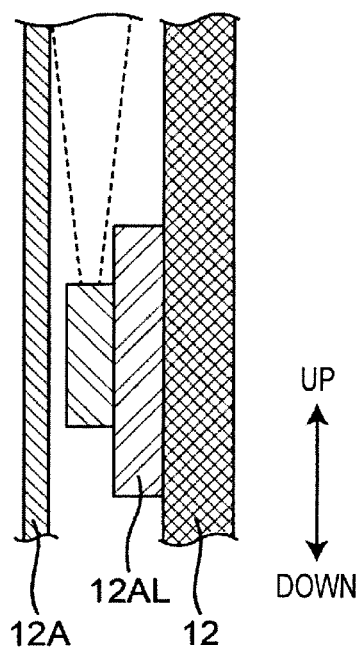
FIG. 9 is a sectional view illustrating the configuration of the vicinity of the partition member according to embodiment 2.

FIG. 8 is a sectional development view illustrating the configuration of the vicinity of the partition member 12 corresponding to the cross section C-C' in FIG. 5. As illustrated in FIG. 8, the light guide plate 12A is disposed adjacent to the left side surface of the partition member 12. The LED light source 12AL is disposed between the light guide plate 12A and the partition member 12. As illustrated in FIG. 9, the LED light source 12AL is disposed to emit light in a direction parallel to the main surface of the light guide plate 12A. Although not illustrated, the light guide plate 12B is also disposed adjacent to the right side surface of the partition member 12. The LED light source 12BL is disposed between the light guide plate 12B and the partition member 12. The LED light source 12BL is disposed to emit light in a direction parallel to the main surface of the light guide plate 12B.

2-1-2. Configuration of Display System

Figure 10:
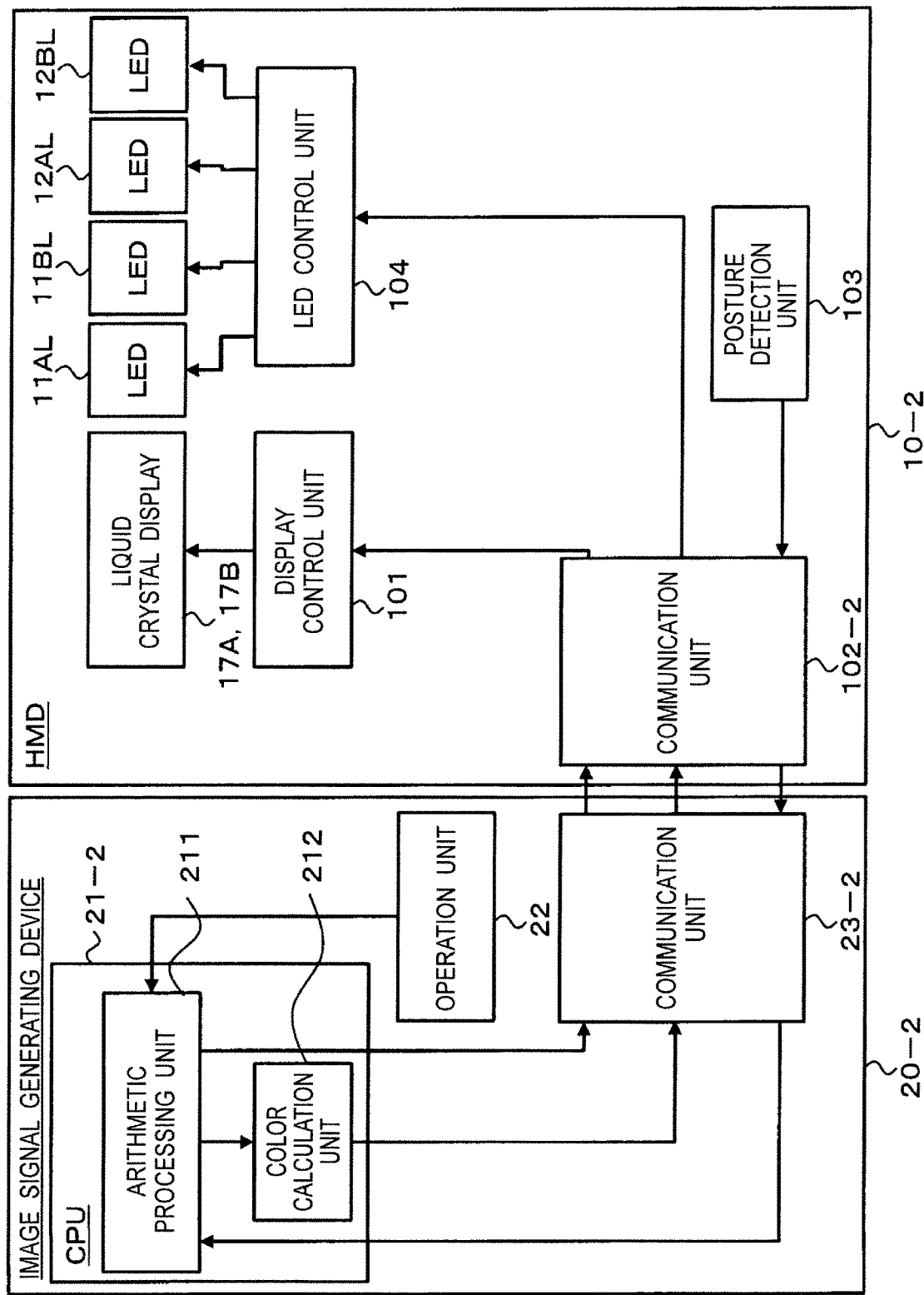
FIG. 10 is a block diagram illustrating the configuration of a display system according to embodiment 2.

FIG. 10 is a block diagram illustrating the configuration of a display system including the above-described HMD 10-2. The display system is provided with the above-described HMD 10-2, and an image signal generation device 20-2 configured to output an image signal to the HMD 10-2. The image signal generation device 20-2 is, for example, a personal computer or a smartphone.

2-1-2-1. Image Signal Generation Device

The configuration of the image signal generation device 20-2 of the present embodiment will be described with reference to FIG. 10. The image signal generation device 20-2 is provided with an operation unit 22, a CPU 21-2, and a communication unit 23-2.

The operation unit 22 is a user interface configured to input a user operation to the image signal generation device 20-2. The operation unit 22 outputs a signal indicating the inputted operation content to the CPU 21-2. The operation unit 22 includes a power switch, a keyboard, a mouse, a touch panel, or the like.

The CPU 21-2 executes an OS or an application program, and controls the overall operation of the image signal generation device 20-2. The CPU 21-2 is provided with an arithmetic processing unit 211 and a color calculation unit 212 as functional configurations. The arithmetic processing by the CPU 21-2 may be realized by an MPU, a DSP, a microcomputer, an FPGA, an ASIC, or the like.

The communication unit 23-2 is a circuit that transmits various types of information to external equipment such as the HMD 10-2 and receives various types of information from external equipment. The communication unit 23-2 is composed of a transmission circuit, a reception circuit, an external connection terminal, and the like. The communication unit 23-2 performs communication according to a predetermined communication standard. The predetermined communication standard is USB (registered trademark), Thunderbolt (registered trademark), USB Type-C (registered trademark), HDMI (registered trademark), or the like.

2-1-2-2. Head Mounted Display

In FIG. 10, the HMD 10-2 is provided with a posture detection unit 103, a communication unit 102-2, a display control unit 101, and an LED control unit 104 in addition to the liquid crystal displays 17A and 17B, and the LED light sources 11AL, 11BL, 12AL, and 12BL.

The posture detection unit 103 outputs a signal having posture information of the HMD 10-2 to the communication unit 102-2. The posture detection unit 103 is constituted of a gyro sensor, an acceleration sensor, an angular velocity sensor, a magnetic sensor, or the like.

The communication unit 102-2 is a circuit that transmits various types of information to external equipment and receives various types of information from external equipment. The communication unit 102-2 includes a transmission circuit, a reception circuit, an external connection terminal, and the like. The communication unit 102-2 performs communication according to a predetermined communication standard. The predetermined communication standard is USB (registered trademark), Thunderbolt (registered trademark), USB Type-C(registered trademark), HDMI (registered trademark), or the like.

The display control unit 101 controls the display operation of the liquid crystal displays 17A and 17B. The display control unit 101 includes a drive circuit that drives the liquid crystal displays 17A and 17B.

The liquid crystal displays 17A and 17B display image under control by the display control unit 101.

The LED control unit 104 controls the LED light sources 11AL, 11BL, 12AL, and 12BL based on a control signal from the image signal generation device 20-2. The LED control unit 104 is constituted of a control circuit including a switching element, for example.

The LED light sources 11AL, 11BL, 12AL, and 12BL output light having an intended color according to a control signal from the LED control unit 104.

2-2. Operation

The operation of the display system according to the present embodiment will be described with reference to FIGS. 10 to 13.

The image signal generation device 20-2 has image data in all directions, for example. The image signal generation device 20-2 periodically detects the posture of the HMD 10-2, and generates image in a direction corresponding to the posture of the HMD 10-2 from the image data in all directions. The image signal generation device 20-2 transmits an image signal indicating the generated image to the liquid crystal displays 17A and 17B.

Figure 11:
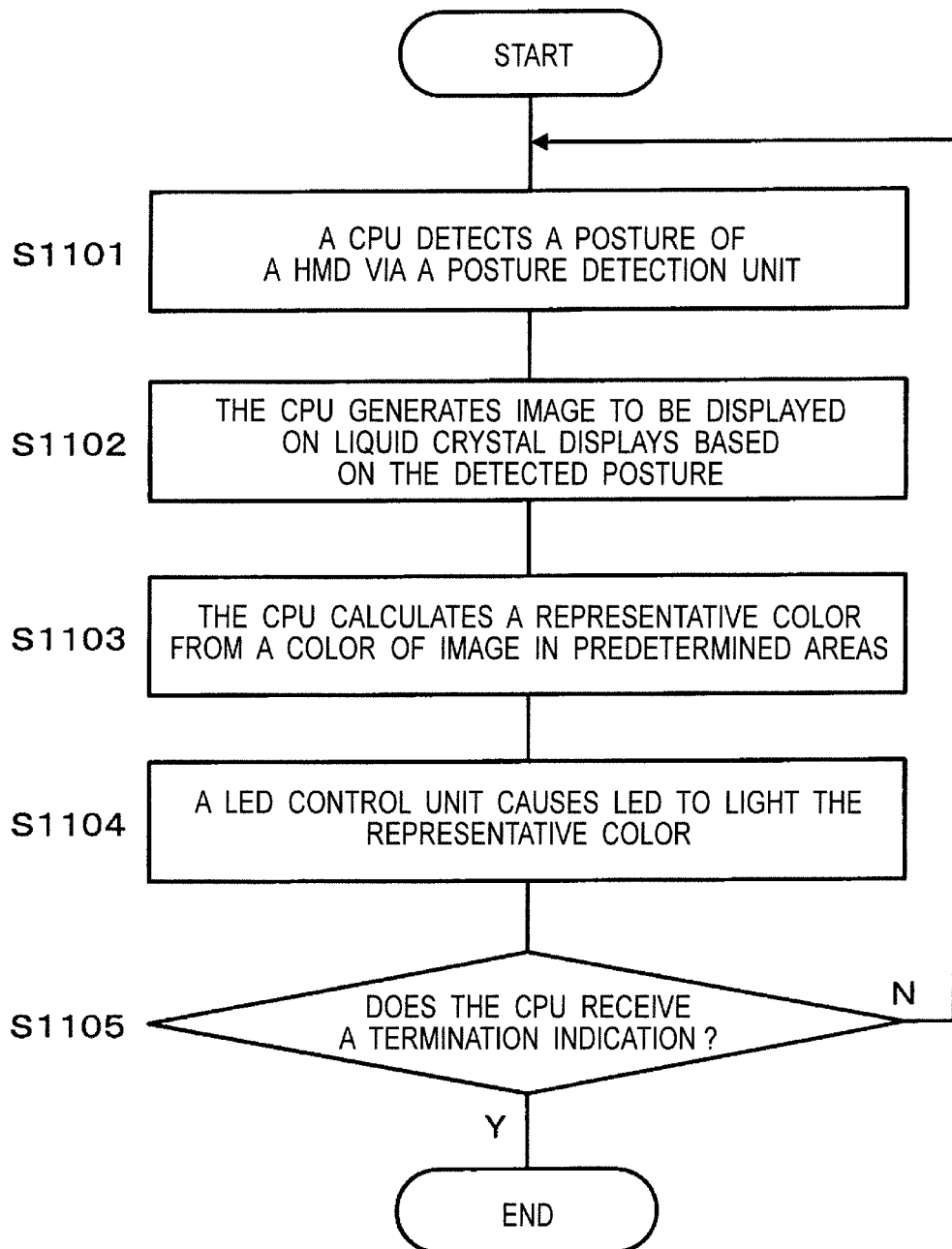
FIG. 11 is a flowchart illustrating the operation of a display system according to embodiment 2.

FIG. 11 is a flowchart illustrating the operation of a display system according to the present embodiment. The user instructs the CPU 21-2 to start this operation via the operation unit 22 of the image signal generation device 20-2.

The arithmetic processing unit 211 of the image signal generation device 20-2 receives a detection signal indicating the posture of the HMD 10-2 from the posture detection unit 103 of the HMD 10-2 via the communication unit 102-2 of the HMD 10-2 and the communication unit 23-2 of the image signal generation device 20-2. The arithmetic processing unit 211 detects the posture of the HMD 10-2 based on the received detection signal (S1101).

The arithmetic processing unit 211 of the image signal generation device 20-2 generates image to be displayed on the liquid crystal displays 17A and 17B based on the detected posture of the HMD 10-2 (S1102). The image signal generation device 20-2 transmits an image signal indicating the generated image to the HMD 10-2 via the communication unit 23-2.

The color calculation unit 212 of the image signal generation device 20-2 calculates a representative color from each of two predetermined areas in the generated image (S1103).

Now, two predetermined areas for calculating the representative color will be described with reference to FIG. 12.

Figure 12:
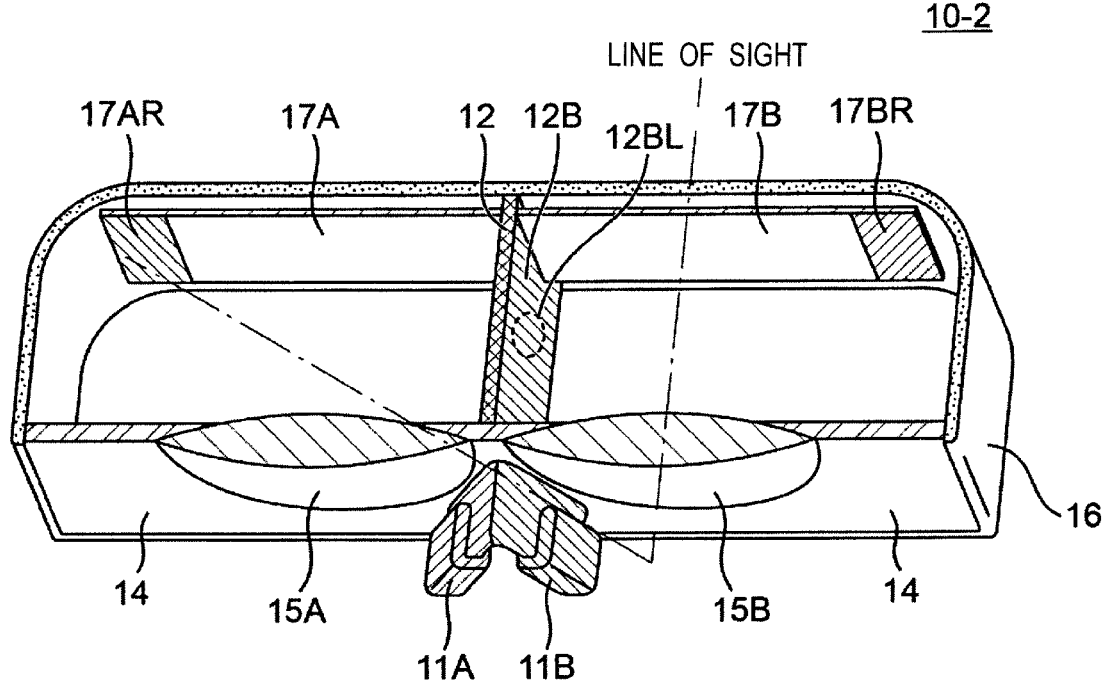
FIG. 12 is a sectional perspective view for explaining the operation of a display system according to embodiment 2.

FIG. 12 is a sectional view of the HMD 10-2. A predetermined area is a left end area 17AR (which will be hereinafter referred to as a "left predetermined area") in the display area of the liquid crystal display 17A for the left eye. The other predetermined area is a right end area 17BR (which will be hereinafter referred to as a right predetermined area) in the display area of the liquid crystal display 17B for the right eye. The representative color is calculated for each of the left predetermined area and the right predetermined area. The representative color is calculated by, for example, averaging the colors of pixels included in each predetermined area.

Returning to FIG. 11, after calculation of the representative color, the LED control unit 104 receives a control signal indicating the representative color from the color calculation unit 212 of the image signal generation device 20-2 via the communication units 23-2 and 102-2. The LED control unit 104 of the HMD 10-2 controls the LED light sources 11AL, 11BL, 12AL, and 12BL to emit light having the representative color according to the received control signal.

That is, the LED control unit 104 controls the LED light sources 11BL and 12BL disposed on the right side to emit light having the representative color of the left predetermined area 17AR. As a result, the light guide plate 11B on the right side of the nose pad 11-2 and the light guide plate 12B on the right side surface of the partition member 12 are irradiated with light from the LED light source 11BL and the LED light source 12BL, and emit the representative color of the left predetermined area 17AR.

Moreover, the LED control unit 104 controls the LED light sources 11AL and 12AL disposed on the left side to emit light having the representative color of the right predetermined area 17BR. As a result, the light guide plate 11A on the left side of the nose pad 11-2 and the light guide plate 12A on the left side surface of the partition member 12 are irradiated with light from the LED light source 11AL and the LED light source 12AL, and emit the representative color of the right predetermined area 17BR.

Thereafter, the CPU 21-2 repeats the above processing (S1101 to S1104) until receiving an instruction from the user to terminate the operation via the operation unit 22 (S1105).

2-3. Summary

As described above, the HMD 10-2 according to the present embodiment causes the light guide plate 11B (11A) of the nose pad 11-2 and the light guide plate 12B (12A) of the partition member 12 that block a part of the field of view of the right eye (left eye) of the user to emit the representative color of image corresponding to the area 17AR (17BR) at the left end of the liquid crystal display 17A (the right end of the liquid crystal display 17B). This synchronizes the colors of the light guide plate 11B (11A) of the nose pad 11-2 and the light guide plate 12B (12A) of the partition member 12 with the color tone of image displayed on the left end of the liquid crystal display 17A (the right end of the liquid crystal display 17B).

Accordingly, the user does not care about the nose pad 11-2 or the partition member 12, and can be immersed in image displayed on the liquid crystal displays 17A and 17B without discomfort.

Although the nose pad 11-2 has been described to be provided with the light guide plates 11A and 11B in the above description, the present disclosure is not limited to this. For example, the nose pad 11-2 itself may be made of a translucent member and also serve as a light guide plate.

In the above description, an example has been illustrated in which both of the light guide plates 11A and 11B of the nose pad 11-2 and the light guide plates 12A and 12B of the partition member 12 emit the representative color. Both of the light guide plates 11A and 11B of the nose pad 11-2 and the light guide plates 12A and 12B of the partition member 12 may emit the color that is equal to or brighter than the skin color. This causes the user to recognize the color that is equal to or brighter than the skin color.

Figure 13A:
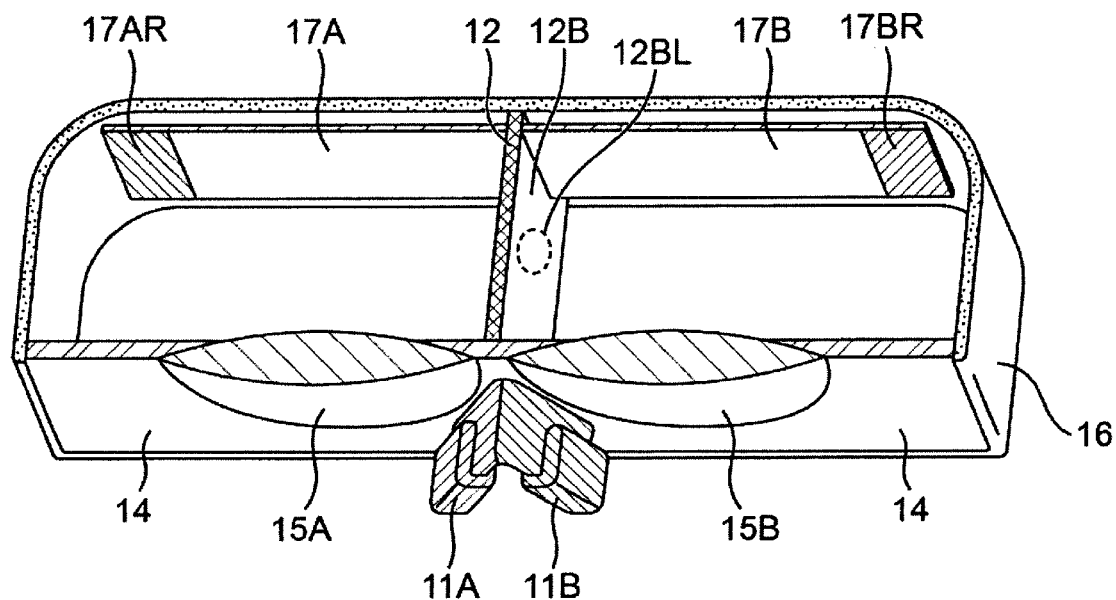
FIGS. 13A and 13B are diagrams illustrating variations of the operation of the HMD according to embodiment 2.
Figure 13B:
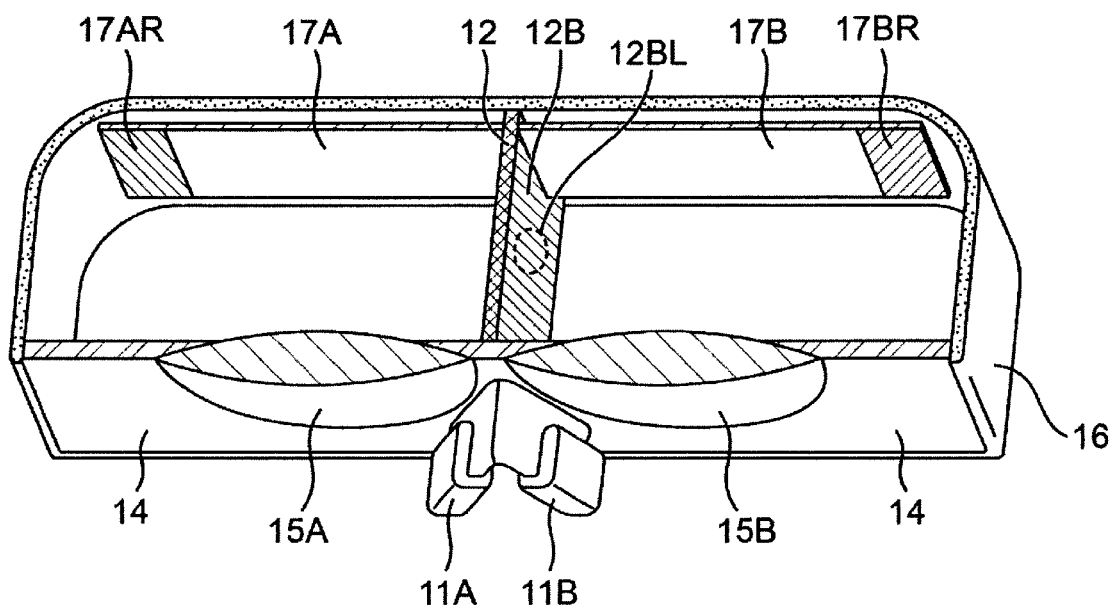

Moreover, for example, only the light guide plates 11A and 11B of the nose pad 11-2 may emit the skin color or a representative color as illustrated in FIG. 13A. Moreover, only the light guide plates 12A and 12B disposed adjacent to the partition member 12 may emit the skin color or a representative color as illustrated in FIG. 13B.

In the above description, the HMD 10-2 is provided with the light guide plates 11A and 11B of the nose pad 11-2, and the light guide plates 12A and 12B disposed adjacent to the partition member 12. The light guide plate is not limited to these. The HMD 10-2 may be further provided with a light guide plate disposed adjacent to each of the left side portion and the right side portion of the nose guard member 13.

In that case, the HMD 10-2 is provided with an LED light source therein configured to irradiate the light guide plate disposed adjacent to each of the left side portion and the right side portion of the nose guard member 13 with light. The HMD 10-2 may cause at least one of the light guide plates 11A and 11B of the nose pad 11-2, the light guide plates 12A and 12B of the partition member 12, and the light guide plate of the nose guard member 13 to emit the skin color or a representative color in a combination not illustrated in FIGS. 5 to 13.

It is to be noted that the light guide plates 11A and 11B of the nose pad 11-2, the light guide plates 12A and 12B disposed adjacent to the partition member 12, and the light guide plate disposed adjacent to each of the left side portion and the right side portion of the nose guard member 13 are merely examples of an inter-lens structure.

Figure 6B:
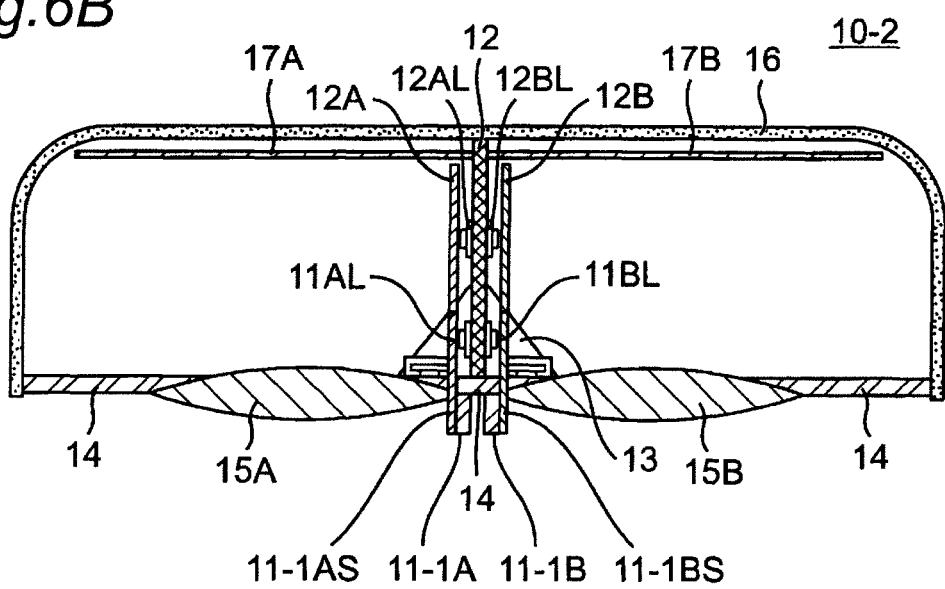

It is to be noted that the nose pad 11-2 is not necessarily required as long as a helmet type or a headband type is used as a method of mounting the HMD 10-2. A protrusion other than the nose pad 11-2 may be formed between the left-eye lens 15A and the right-eye lens 15B. The protrusion protrudes toward the nose of the user when the user wears the HMD 10-2, that is, away from the left-eye lens 15A and the right-eye lens 15B. For example, the frame protrusion 11-1A and the frame protrusion 11-1B illustrated in FIG. 2C of embodiment 1 emit light having the skin color or a representative color. FIG. 6B is a sectional view of the HMD 10-2 corresponding to the cross section A-A' in FIG. 2C. For example, the light guide plate 11-1BS of the frame protrusion 11-1B on the right side is irradiated with light from the LED light source 11BL, and emits a representative color of the left predetermined area 17AR. The light guide plate 11-1AS of the frame protrusion 11-1A on the left side is irradiated with light from the LED light source 11AL, and emits a representative color of the right predetermined area 17BR.

It is to be noted that the light guide plate 11-1AS and the light guide plate 12A, and the light guide plate 11-1BS and the light guide plate 12B may be shared to reduce the LED light sources 12AL and 12BL.

Although the left-eye and right-eye frame protrusions 11-1A and 11-1B are separated and formed into two hills in the example of FIG. 2C, it is to be noted that the left-eye and right-eye frame protrusions 11-1A and 11-1B may be formed in one hill, or may be combined with a nose pad.

Embodiment 3

In the present embodiment, the configuration of an HMD that changes the color of the nose pad according to the skin color of the user will be described.

3-1. Configuration
3-1-1. Configuration of Head Mounted Display

Figure 14:
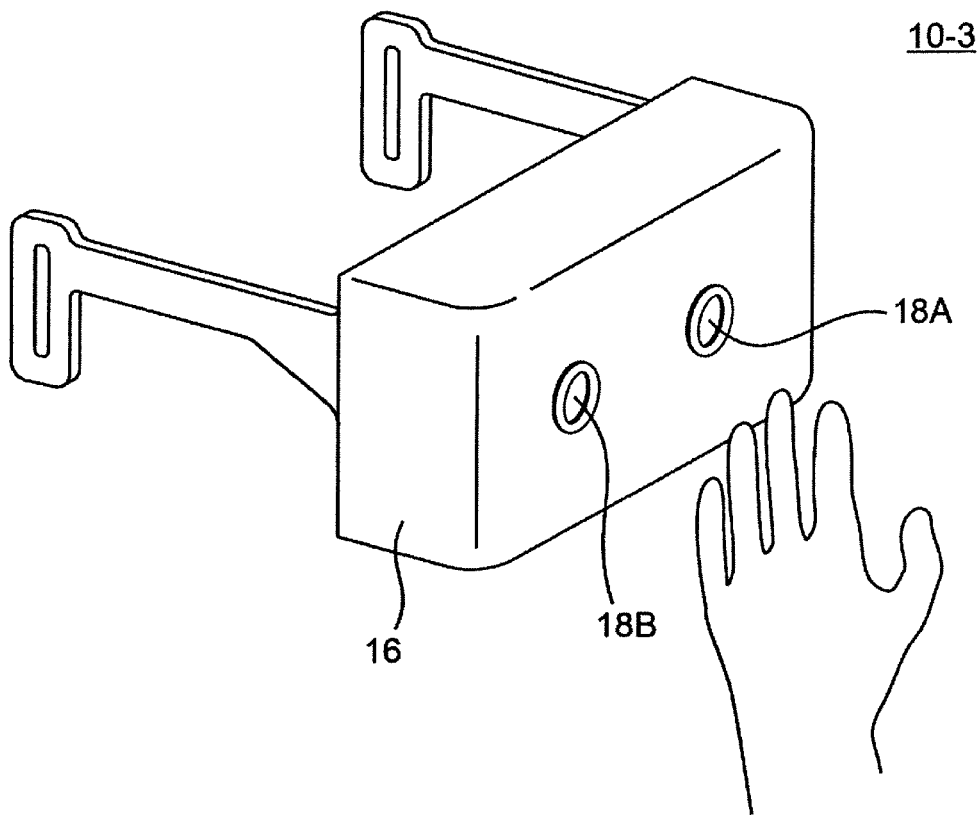
FIG. 14 illustrates an arrangement example of an HMD camera according to embodiment 3.
Figure 15:
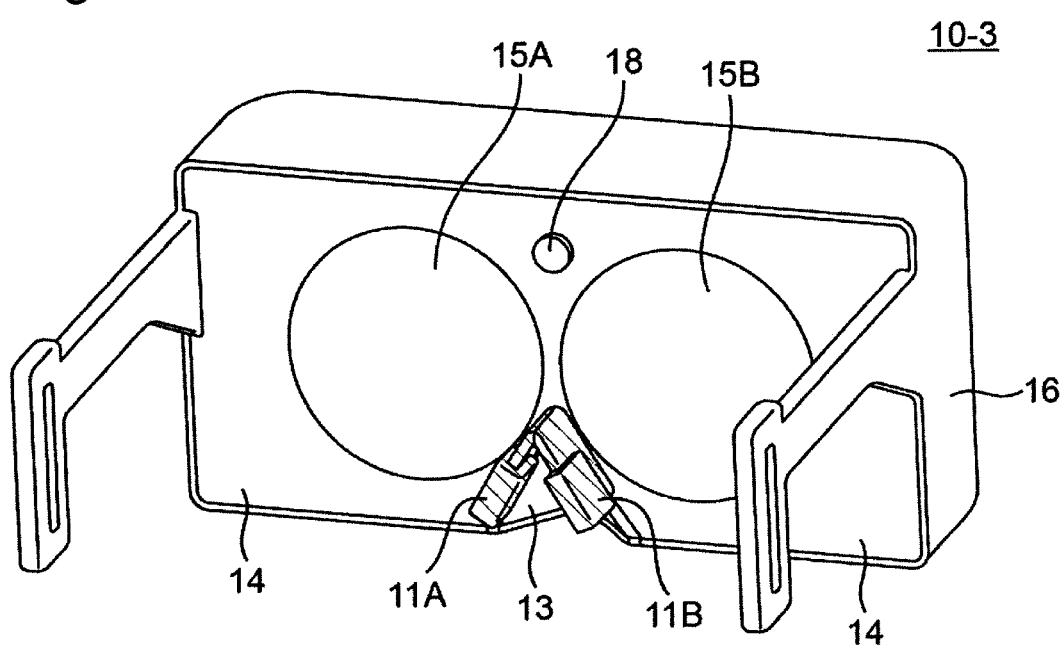
FIG. 15 illustrates another arrangement example of the HMD camera according to embodiment 3.

An HMD 10-3 according to the present embodiment will be described with reference to FIGS. 14 to 18. The HMD 10-3 according to the present embodiment is further provided with a camera in addition to the configuration of the HMD 10-2 of embodiment 2. Specifically, the HMD 10-3 is provided with two cameras 18A and 18B on the front surface of the HMD 10-3 as illustrated in FIG. 14. It is to be noted that a camera 18 may be provided on the rear surface of the HMD 10-3 as illustrated in FIG. 15 instead of or in addition to the front cameras 18A and 18B. Moreover, one camera may be provided on the front surface of the HMD 10-3 instead of the two front cameras 18A and 18B.

3-1-2. Configuration of Display System

Figure 16:
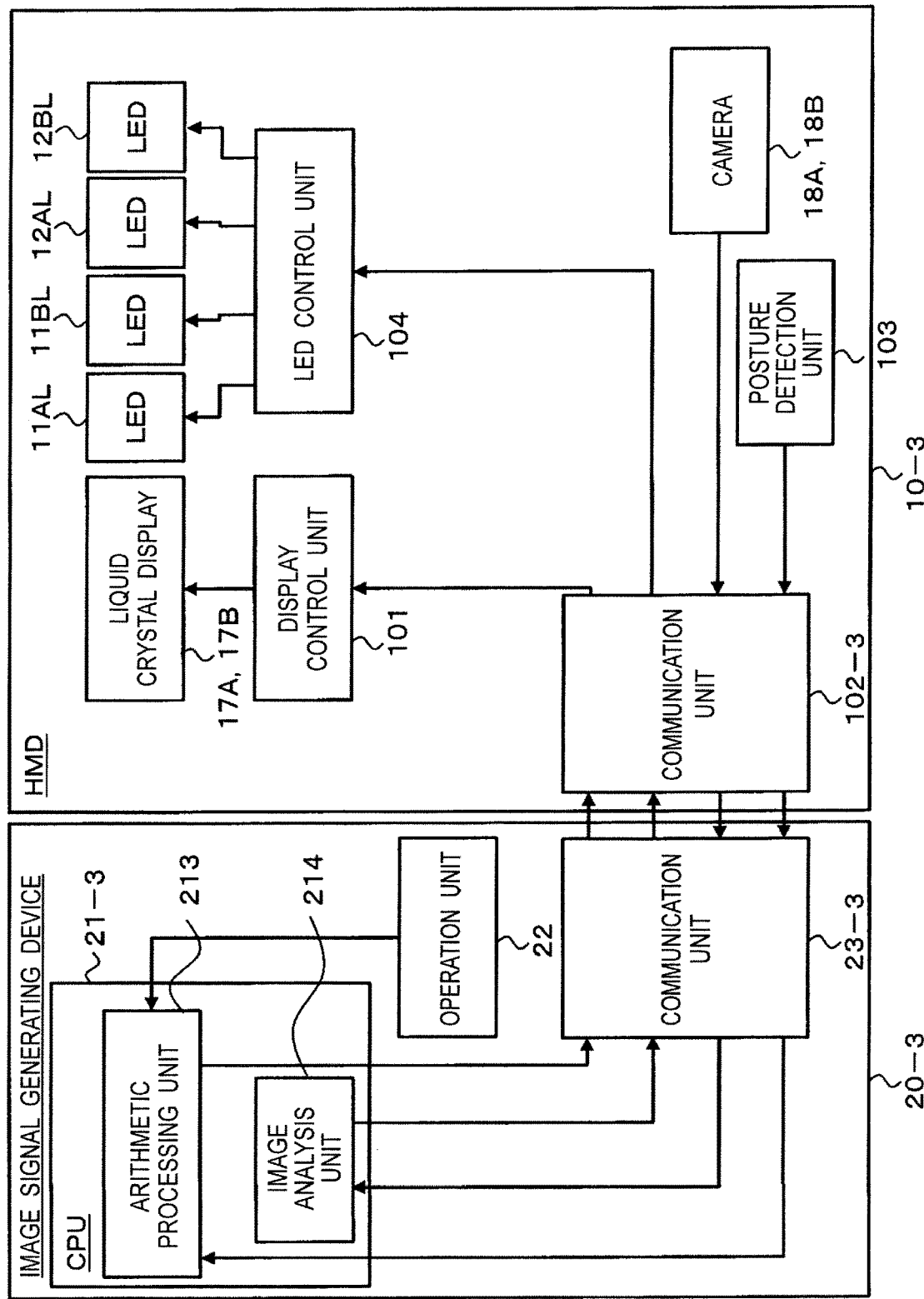
FIG. 16 is a block diagram illustrating the configuration of a display system according to embodiment 3.

FIG. 16 is a block diagram illustrating the configuration of a display system according to embodiment 3. The display system is provided with the above-described HMD 10-3, and an image signal generation device 20-3 configured to transmit an image signal to the HMD 10-3.

The image signal generation device 20-3 of the present embodiment is different from the image signal generation device 20-2 of embodiment 2 in that a CPU 21-3 is provided with an arithmetic processing unit 213 and an image analysis unit 214.

The HMD 10-3 is further provided with the cameras 18A and 18B. Image data indicating images captured by the cameras 18A and 18B is transmitted to the image signal generation device 20-3 via a communication unit 102-3.

The cameras 18 are used to detect the skin color of the user. In the example of FIG. 14, the display system detects the skin color of the user by photographing and analyzing a hand of the user via the cameras 18A and 18B. In the example of FIG. 15, the display system detects the skin color of the user by photographing and analyzing the skin color of the forehead of the user via the camera 18.

3-2. Operation

The operation of a display system according to the present embodiment will be described.

The user wearing the HMD 10-3 holds a part of his/her body (e.g., the back of a hand, an arm, a foot) with the skin exposed in front of the cameras 18A and 18B of the HMD 10-3 and photographs an image of the skin of the user with the cameras 18A and 18B. The HMD 10-3 transmits image data indicating an image of skin to the image signal generation device 20-3 via the communication unit 102-3. The image signal generation device 20-3 analyzes the image received from the HMD 10-3 and detects the skin color of the user. The image signal generation device 20-3 transmits information indicating the detected skin color to the HMD 10-3. The HMD 10-3 causes the nose pad 11-2 and the partition member 12 to emit a color similar to the detected skin color of the user based on the information received from the image signal generation device 20-3.

Figure 17:
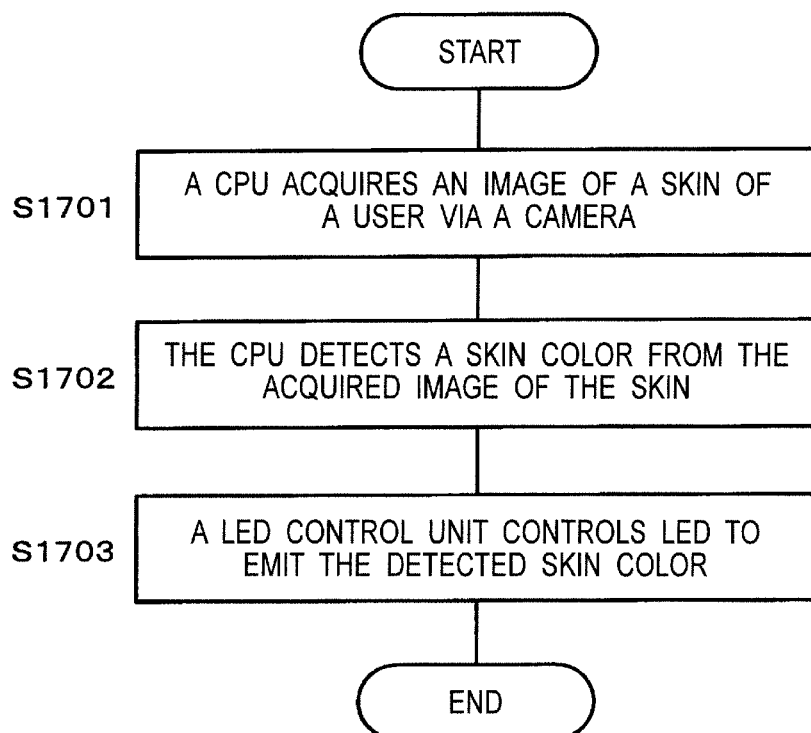
FIG. 17 is a flowchart illustrating the operation of the display system according to embodiment 3.

FIG. 17 is a flowchart illustrating light emission control of the nose pad 11-2 and the partition member 12 in the display system according to the present embodiment.

The image analysis unit 214 of the image signal generation device 20-3 acquires image data of an image obtained by photographing the skin of the user from the HMD 10-3 (S1701).

The image analysis unit 214 of the image signal generation device 20-3 analyzes the acquired image and detects the skin color of the user (S1702). The image signal generation device 20-3 transmits information indicating the detected skin color to the HMD 10-3.

The LED control unit 104 of the HMD 10-3 controls the LED light sources 11AL, 11BL, 12AL, and 12BL to emit light having the detected skin color based on the received information (S1703). This causes the light guide plates 11A and 11B of the nose pad 11-2 and the light guide plates 12A and 12B of the partition member 12 to emit the detected skin color.

3-3. Summary

As described above, the image signal generation device 20-3 according to the present embodiment detects the skin color of the user by photographing and analyzing the skin of the user using the cameras 18 of the HMD 10-3. The HMD 10-3 causes the light guide plates 11A and 11B of the nose pad 11-2 and the light guide plates 12A and 12B of the partition member 12 to emit a color equivalent to the detected skin color based on the detected skin color. In this way, since the colors of the nose pad 11-2 and the partition member 12 are matched to the skin color of the user, the user is less likely to be discomforted compared to embodiments 1 and 2, and can be immersed in image displayed on the HMD 10-3.

In the above description, an example is illustrated in which the colors of both of the nose pad 11-2 and the partition member 12 are controlled to be the detected skin color of the user. The color of only one of the nose pad 11-2 and the partition member 12 may be controlled to be the detected skin color of the user.

In embodiment 3, the HMD 10-3 may be further provided with a light guide plate disposed adjacent to each of the left side portion and the right side portion of the nose guard member 13.

In that case, the HMD 10-3 is provided with an LED light source therein that irradiates a light guide plate disposed adjacent to the left side portion of the nose guard member 13 with light. The HMD 10-3 is also provided with an LED light source therein that irradiates a light guide plate disposed adjacent to the right side portion of the nose guard member 13 with light. The HMD 10-3 may cause at least one of the light guide plates 11A and 11B of the nose pad 11-2, the light guide plates 12A and 12B of the partition member 12, and the light guide plate of the nose guard member 13 to emit a representative color.

Figure 18:
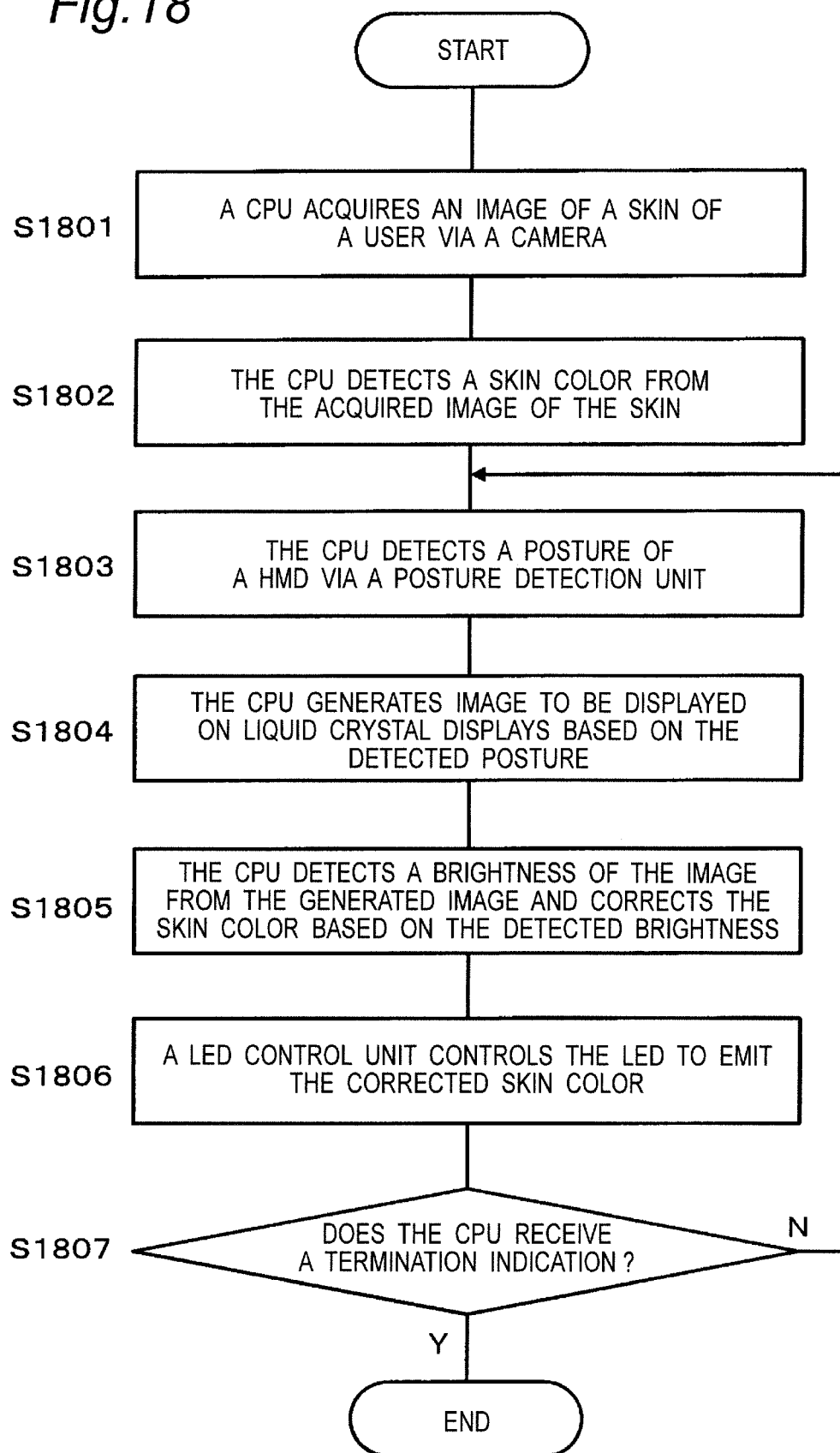
FIG. 18 is another flowchart illustrating the operation of the display system according to embodiment 3.

Although the colors of the nose pad 11-2 and the partition member 12 are controlled according to the skin color of the user captured by a camera in the above example, the colors of the nose pad 11-2 and the partition member 12 may be further adjusted in consideration of the brightness of image displayed on the liquid crystal display. FIG. 18 illustrates a flowchart related to such color control of the nose pad 11-2 and the partition member 12.

The image analysis unit 214 of the image signal generation device 20-3 acquires image data of an image obtained by photographing the skin of the user from the HMD 10-3 (S1801).

The image analysis unit 214 analyzes the acquired image data and detects the skin color of the user (S1802).

The arithmetic processing unit 213 of the image signal generation device 20-3 receives a signal indicating the posture of the HMD 10-3 from the HMD 10-3 and detects the posture of the HMD 10-3 (S1803). It is to be noted that the posture detection unit 103 of the HMD 10-3 detects the posture of the HMD 10-3 and transmits a signal indicating the detected posture to the image signal generation device 20-3.

The arithmetic processing unit 213 generates image to be displayed on the liquid crystal displays 17A and 17B based on the detected posture of the HMD 10-3 (S1804).

The arithmetic processing unit 213 detects the brightness of the image from the generated image and corrects the detected skin color based on the detected brightness (S1805). Information indicating the corrected skin color is transmitted to the HMD 10-3 via the communication unit 23-3.

The HMD 10-3 receives information indicating the corrected skin color, and the LED control unit 104 of the HMD 10-3 controls the LED light sources 11AL, 11BL, 12AL, and 12BL to emit light having the corrected skin color (S1806). This causes the light guide plates 11A and 11B of the nose pad 11-2 and the light guide plates 12A and 12B of the partition member 12 to emit a color obtained by correcting the detected skin color based on the brightness of the image.

Thereafter, the above processing (S1803 to S1806) is repeated until the user instructs termination (S1808).

According to the control illustrated in the flowchart of FIG. 18, the light guide plates 11A and 11B of the nose pad 11-2 and the light guide plates 12A and 12B of the partition member 12 emit a skin color corrected based on the brightness of the image on the liquid crystal displays 17A and 17B. This allows the user to be immersed in image displayed by the HMD 10-3 with discomfort further reduced.

OTHER EMBODIMENTS

As described above, embodiments have been described as illustrations of the technique disclosed in the present application. However, the technique in the present disclosure is not limited to these, and is also applicable to embodiments obtained by appropriate changes, replacements, additions, omissions, or the like. Moreover, it is also possible to combine components described in the above embodiments to make a new embodiment.

In embodiment 1, the nose pad, the partition member, and the nose guard member may be detachable.

Although the display system is provided with the HMDs 10-1, 10-2, and 10-3, and the image signal generation devices 20-1, 20-2, and 20-3 in embodiments 1 to 3, at least a part of the functions of the image signal generation devices 20-1, 20-2, and 20-3 may be implemented on the HMD side.

Although there is a parallax between image displayed on the liquid crystal display 17A for the left eye of the HMD and image displayed on the liquid crystal display 17B for the right eye in embodiments 1 to 3, it is not necessarily required to have a parallax therebetween.

In HMDs 10-2 and 10-3 of embodiments 2 and 3, the nose pads, the partition members, and the nose guard members are caused to emit a predetermined color tone using the light guide plates and the LED light sources. A display device such as an organic EL display or a liquid crystal display may be used instead of the light guide plates and the LED light sources.

In embodiments 1 to 3, the lenses 15A and 15B illustrated in the drawings are merely examples, and are not limited to have the shapes and sizes illustrated in the drawings. For example, the lens effective diameters of the lenses 15A and 15B may be made larger than those illustrated in the drawings.

As described above, the embodiments have been described as illustrations of the technique in the present disclosure. The accompanying drawings and the detailed description are provided for that purpose.

Accordingly, components described in the accompanying drawings and the detailed description may include not only components essential for solving the problem, but also components not essential for solving the problem in order to illustrate the above technique. Therefore, it should not be immediately recognized that these non-essential components are essential even though those non-essential components are described in the accompanying drawings or the detailed description.

Moreover, since the above-described embodiments are for illustrating the technique in the present disclosure, various changes, substitutions, additions, omissions, or the like can be made in claims or equivalent scope thereof.

What is claimed is:

1. A head mounted display to be worn on a head of a user, the head mounted display comprising:
a display device configured to display an image;
a casing that houses the display device;
a right-eye lens and a left-eye lens attached to the casing; and
an inter-lens structure disposed between the right-eye lens and the left-eye lens,
wherein the head mounted display causes the user to recognize a color of at least a part of the inter-lens structure as a color that is equal to or brighter than a skin color when the user wears the head mounted display.

2. The head mounted display according to claim 1, wherein the color that is equal to or brighter than the skin color is a color having a value of R within 65 to 255, a value of G within 39 to 255, and a value of B within 26 to 255 in an RGB color model in which R, G, and B are respectively represented with values of 0 to 255.

3. The head mounted display according to claim 2, wherein painting in the color that is equal to or brighter than the skin color is applied to the inter-lens structure, and the painting is irradiated with light emitted from the display device so that the user recognizes the color that is equal to or brighter than the skin color.

4. The head mounted display according to claim 2, wherein the inter-lens structure has a reflector configured to reflect light, and the reflector reflects light emitted from the display device so that the user recognizes the color that is equal to or brighter than the skin color.

5. The head mounted display according to claim 2, wherein the inter-lens structure has a light guide plate configured to guide light, and the light guide plate guides light emitted from the display device so that the user recognizes the color that is equal to or brighter than the skin color.

6. The head mounted display according to claim 2, wherein the inter-lens structure has a light emitter configured to emit light, and the light emitter emits light so that the user recognizes the color that is equal to or brighter than the skin color.

7. The head mounted display according to claim 2, wherein the inter-lens structure has a shape protruding toward a nose of the user when the user wears the head mounted display.

8. The head mounted display according to claim 7, wherein the inter-lens structure has a shape protruding toward the nose of the user along boundary parts between a fixing member configured to fix the right-eye lens and the left-eye lens, and the right-eye lens and the left-eye lens.

9. The head mounted display according to claim 7, wherein the inter-lens structure has a shape coming into contact with a left slope and a right slope of the nose of the user.

10. The head mounted display according to claim 7, wherein the inter-lens structure comes into contact with the nose of the user and fixes the head mounted display to a face of the user.

11. The head mounted display according to claim 2, wherein the display device has a first area where image to be presented to a left eye of the user is displayed, and a second area where image to be presented to a right eye of the user is displayed, and
the inter-lens structure is a partition provided in the casing so that image in the first area is not visually recognized by the right eye of the user and image in the second area is not visually recognized by the left eye of the user.

12. The head mounted display according to claim 2, wherein the inter-lens structure is a member attached to the casing to protrude inward from the casing so that a nose of the user does not interfere with the casing when the user wears the head mounted display.

13. A head mounted display to be worn on a head of a user, the head mounted display comprising:
- a first display device configured to display an image to be presented to a left eye of the user;
- a second display device configured to display an image to be presented to a right eye of the user;
- a casing that houses the first and second display devices;
- a right-eye lens and a left-eye lens attached to the casing;
- an inter-lens structure disposed between the left-eye lens and the right-eye lens; and
- a camera configured to capture an image of a skin of the user,
- wherein the inter-lens structure includes a light emitter configured to emit light in an intended color,
- wherein the light emitter changes a color of emitted light based on image in a predetermined area of each display area of the first and second display devices, and
- wherein the light emitter changes a color of emitted light based on a skin color of the user included in the captured image.

14. A head mounted display to be worn on a head of a user, the head mounted display comprising:
- a first display device configured to display an image to be presented to a left eye of the user;
- a second display device configured to display an image to be presented to a right eye of the user;
- a casing that houses the first and second display devices;
- a right-eye lens and a left-eye lens attached to the casing;
- an inter-lens structure disposed between the left-eye lens and the right-eye lens; and
- a camera configured to capture an image of a skin of the user,
- wherein the inter-lens structure includes a light emitter configured to emit light in an intended color,
- wherein the light emitter changes a color of emitted light based on image in a predetermined area of each display area of the first and second display devices,
- wherein the light emitter changes a color of emitted light based on a skin color of the user included in the captured image, and
- wherein the light emitter changes a color of emitted light based on the skin color of the user included in the captured image and a brightness of image displayed in the display area.

* * * * *